US012697835B2

(12) United States Patent
Vo

(10) Patent No.: US 12,697,835 B2
(45) Date of Patent: Aug. 4, 2026

(54) GRIP FOR A HAND-HELD INSTRUMENT

(71) Applicant: Sam Van Vo, Minneapolis, MN (US)

(72) Inventor: Sam Van Vo, Minneapolis, MN (US)

(*) Notice: Subject to any disclaimer, the term of this patent is extended or adjusted under 35 U.S.C. 154(b) by 0 days.

(21) Appl. No.: 18/743,865

(22) Filed: Jun. 14, 2024

(65) Prior Publication Data

US 2025/0381793 A1 Dec. 18, 2025

(51) Int. Cl.
*B43K 23/008* (2006.01)

(52) U.S. Cl.
CPC .................................. *B43K 23/008* (2013.01)

(58) Field of Classification Search
CPC .. B43K 23/004; B43K 23/008; B43K 23/016; B43K 23/02; B43K 23/04
USPC .............................................. 401/6, 48, 131
See application file for complete search history.

(56) References Cited

U.S. PATENT DOCUMENTS 3,972,628 A * 8/1976 Stevers ................... B43L 15/00 401/48
4,906,119 A * 3/1990 Hartford ................ B43K 7/005 401/48
6,430,782 B1 * 8/2002 Torres ..................... A24F 15/18 24/339
6,705,788 B2 3/2004 Gadberry
6,942,408 B2 * 9/2005 Smith .................... B43K 29/00 401/6
7,484,903 B2 * 2/2009 Komorowski ....... G06F 3/03545 401/48
7,677,824 B2 * 3/2010 Yoon .................... B43K 23/008 401/117
8,152,396 B2 * 4/2012 Kuykendall ......... B43K 23/004 224/217
8,156,610 B2 * 4/2012 McKenzie ........... B43K 23/004 401/6
D928,315 S 8/2021 Morrison
D983,880 S 4/2023 Cuban
2006/0083575 A1 * 4/2006 Kim ..................... B43K 23/008 401/48
2006/0174448 A1 * 8/2006 You ........................ G09B 11/02 16/430

FOREIGN PATENT DOCUMENTS

KR 20190106384 A * 9/2019 ........... B43K 23/004

OTHER PUBLICATIONS

KR 20190106384 Translation (Year: 2019).*
Maddak Arthwriter Hand Aid, [site visited Jun. 6, 2024], https://www.amazon.com/Arthwriter-Hand-Writing-People-Arthritis/dp/B07BFQCH71/, first available Jun. 22, 2012.

* cited by examiner

*Primary Examiner* — David P Angwin
*Assistant Examiner* — Bradley S Oliver
(74) *Attorney, Agent, or Firm* — Foley & Lardner LLP

(57) ABSTRACT

A grip for a hand-held instrument includes a top side, a bottom side including a first portion oriented at an acute angle relative to the top side, a front side continuous with the first portion of the bottom side, a back side including a first portion continuous with a second portion, and a channel extending from the top side to the bottom side. The first portion is oriented at a first obtuse angle relative to the top side. The second portion is oriented at a second obtuse angle relative to the bottom side. The channel defines a relief slot and an instrument axis. The instrument axis extends through the first portion of the bottom side.

20 Claims, 18 Drawing Sheets

GRIP FOR A HAND-HELD INSTRUMENT

BACKGROUND

The present disclosure relates generally to a hand-held aid or a grip for an instrument. More specifically, the present disclosure relates to a grip to be held in a user's hand to assist with grasping a hand-held instrument.

SUMMARY

At least one embodiment relates to a grip for a hand-held instrument. The grip includes a top side, a bottom side including a first portion oriented at an acute angle relative to the top side, a front side continuous with the first portion of the bottom side, a back side including a first portion continuous with a second portion, and a channel extending from the top side to the bottom side. The first portion is oriented at a first obtuse angle relative to the top side. The second portion is oriented at a second obtuse angle relative to the bottom side. The channel defines a relief slot and an instrument axis. The instrument axis extends through the first portion of the bottom side.

Another embodiment relates to a grip for a hand-held instrument. The grip includes a top side, a bottom side including a first portion and a second portion, a channel extending from the top side to the bottom side, a relief slot positioned within the channel, a front side configured to engage one or more fingers of a user's hand, a back side configured to support a portion of a palm of the user's hand, and a lateral side configured to support a portion of a user's thumb. The first portion of the bottom side is oriented at a first obtuse angle relative to the second portion of the bottom side. The channel is configured to receive at least a portion of the hand-held instrument. The channel is open to the front side. The back side includes a first portion oriented at a second obtuse angle relative to the top side.

Another embodiment relates to a grip assembly. The grip assembly includes a grip and an attachment coupled to the grip. The grip includes a top side, a bottom side including a first portion oriented at an acute angle relative to the top side, a front side continuous with the first portion of the bottom side, a back side including a first portion continuous with a second portion, and a channel extending from the top side to the bottom side. The first portion of the back side is oriented at a first obtuse angle relative to the top side. The second portion of the back side is oriented at a second obtuse angle relative to the bottom. The channel defines a relief slot and an instrument axis. The instrument axis extends through the first portion of the bottom side. The attachment is structured to be received by the channel and positioned along the instrument axis.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
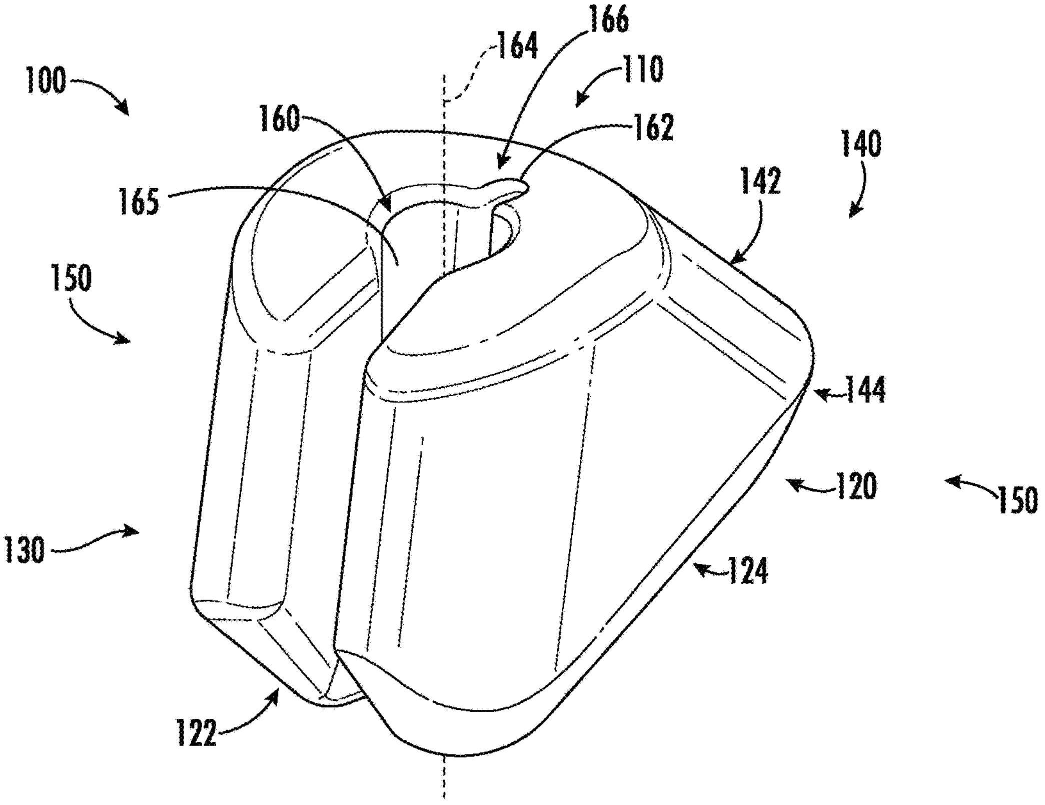
FIG. 1 is a perspective view of a grip, according to an exemplary embodiment.
Figure 2:
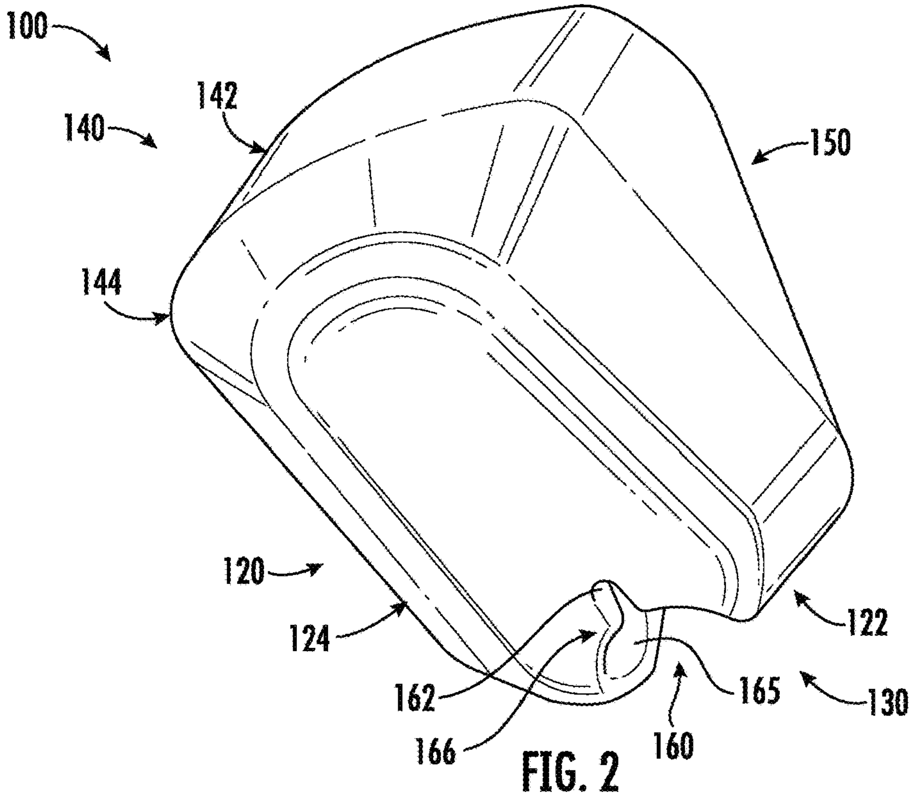
FIG. 2 is a perspective view of the grip of FIG. 1.
Figure 3:
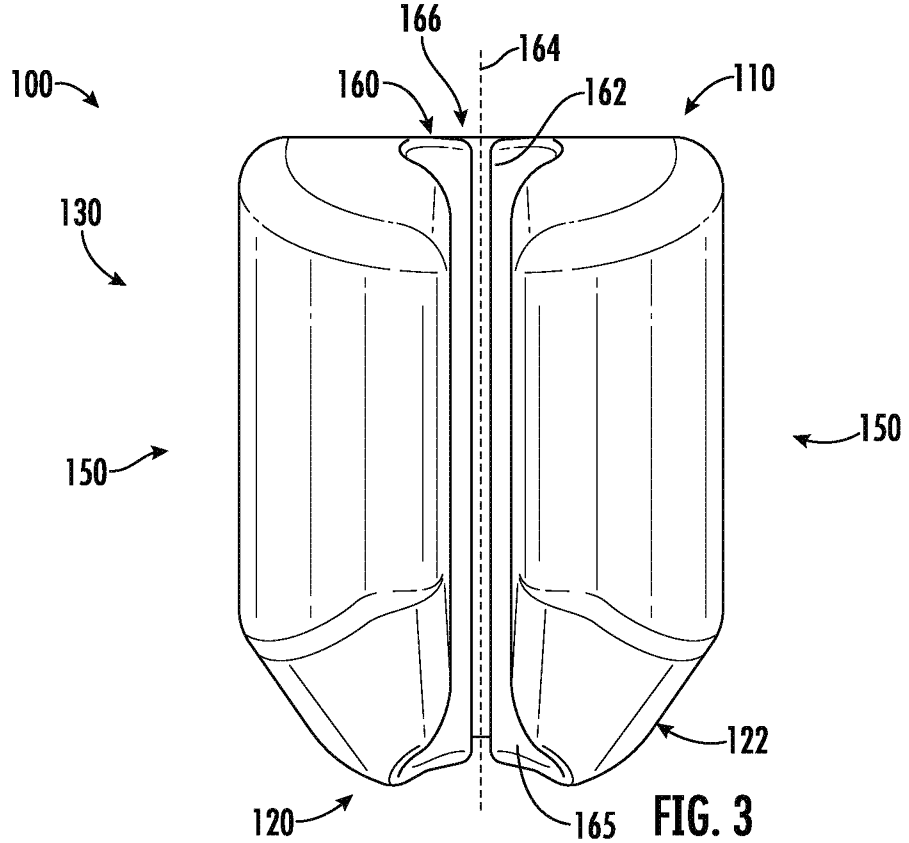
FIG. 3 is a front view of the grip of FIG. 1.
Figure 4:
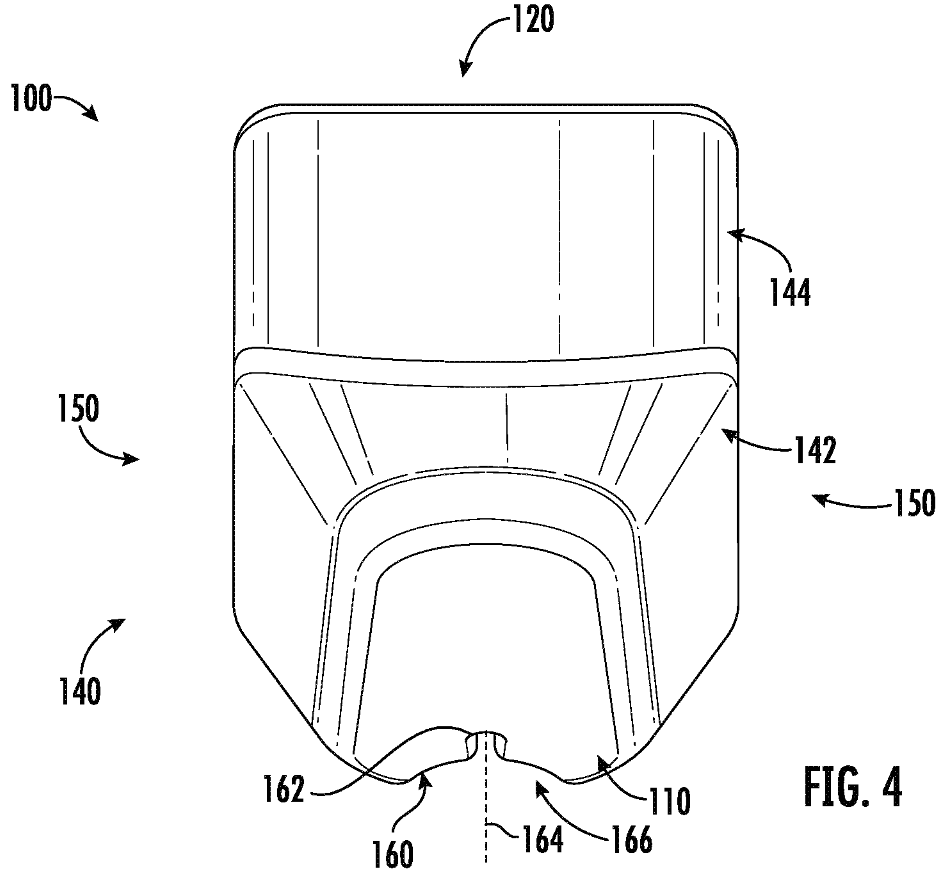
FIG. 4 is a rear view of the grip of FIG. 1.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "hand-held instrument" means a tool, an object, a utensil, or apparatus held by a hand of a user to complete a task. The term "hand-held instrument" is intended to be construed broadly to include hand-held devices of a wide variety of applications or uses, spanning from creative or artistic uses, industrial uses, medical uses, academic uses, or other uses, among others. For example, in some embodiments, the hand-held instrument may correspond to a geometry defined by a grip or an attachment, as described herein. In some embodiments, the grip or the attachment may be used to assist or complement the hand-held instrument in completing the task. In some embodiments, the hand-held instrument is a writing or drawing utensil, such as a pencil, a pen, a paintbrush, a marker, a stylus, or other instrument held in the hand of a user to write or draw. In some embodiments, the hand-held instrument is equipment or machinery, such as a tattoo machine or iron, a soldering machine or iron, an ultrasonic etching device, or other equipment or machinery held in the hand of a user. In some embodiments, the hand-held instrument is a tool, such as a pick, a scraper, a screwdriver, a hammer, a wrench, or other tool held in the hand of a user. In some embodiments, the hand-held instrument is a personal care item, such as a brush, a comb, a toothbrush, a shaver, or other personal care item held in the hand of a user. In yet other embodiments, the instrument can be a medical or dental device, such as a scalpel, a forceps, a retractor, a suction tube, a dental scraper, a dental pick, or some other device.

Referring generally to FIGS. 1-29, a grip (e.g., a hand-held aid, an assistive grip, or some other grip) is disclosed. The grip may be used to assist a user with holding a hand-held instrument. The grip allows the user to hold the hand-held instrument for extended periods of time and reduces the likelihood of fatigue that may result after an extended period of holding a pencil, pen, a tattoo gun, a soldering iron, or other hand-held instrument. The grip is configured to support the user's hand by engaging the user's palm and allowing the user's hand to hold the hand-held instrument with the user's hand in a natural position for the user. The user may insert or removably couple a hand-held instrument to the grip to increase a contact area between a hand of the user and the grip relative to a contact area between the hand of the user and the hand-held instrument. In some examples, the hand-held instrument can be removably coupled with an attachment, and the attachment can be removably coupled with the grip. The grip includes a slot, insert, or channel that receives the hand-held instrument or the attachment. In some embodiments, a back side of the grip is angled relative to a bottom side of the grip to provide support to a palm of the hand of the user by filling negative space within the palm of the hand of the user. In some embodiments, the hand-held instrument may be a pencil, pen, a soldering iron or tool, a glue gun, a tattoo machine or iron, or other hand-held object (such as those described in the non-exhaustive list above) that requires the user to hold the hand-held object in their hand for a period of time. In some embodiments, the attachment receives the hand-held instrument. In such embodiments, the attachment acts as an adaptor to enable the hand-held device to fit within the channel of the grip.

FIGS. 1-8, among others, show a grip 100. The grip 100 can be a hand-held device, an assistive grip, or some other grip for a hand-held instrument. The grip 100 includes one or more sides (e.g., surface, portion, end, or other portion). The one or more sides of the grip 100 include a first or top side 110, an opposing second side, shown as bottom side 120, a front side 130, a back side 140, a right or first lateral side and a left or second lateral side, each shown as lateral side 150, and a channel 160. In some embodiments, the one or more sides of the grip 100 are continuous and are distinguishable by a contour or shape of the grip 100. In other embodiments, a discrete, defined, or hard edge can separate two or more of the sides of the grip 100.

Figure 5:
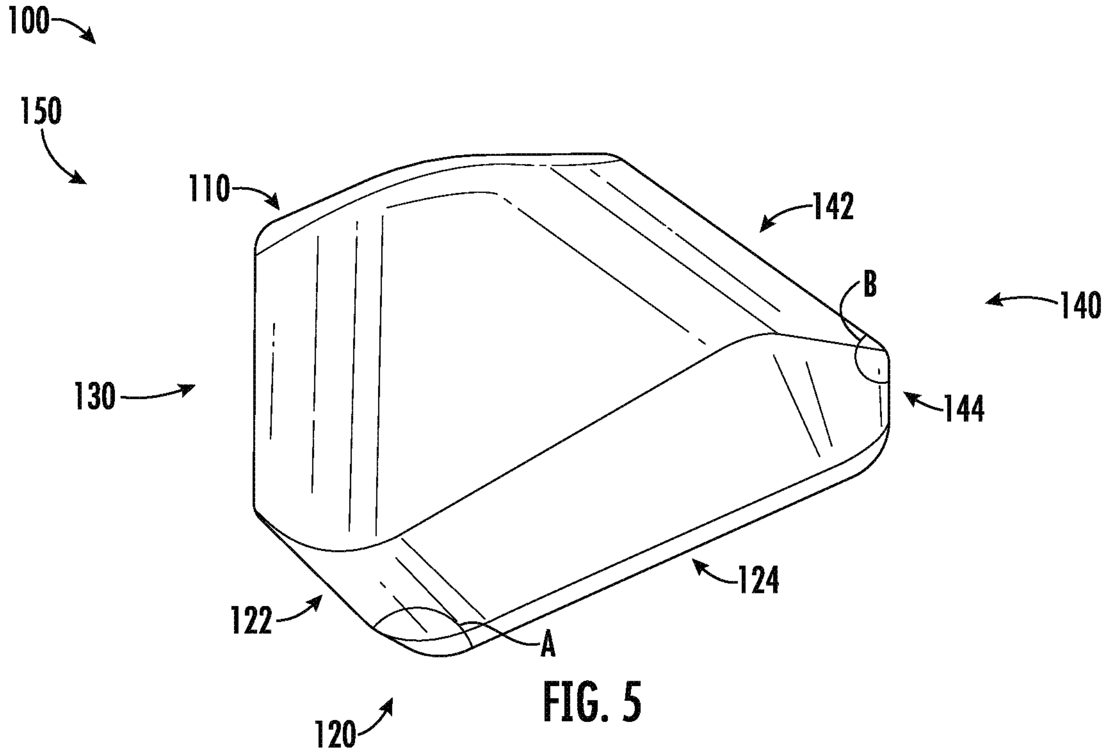
FIG. 5 is a right side view of the grip of FIG. 1.
Figure 6:
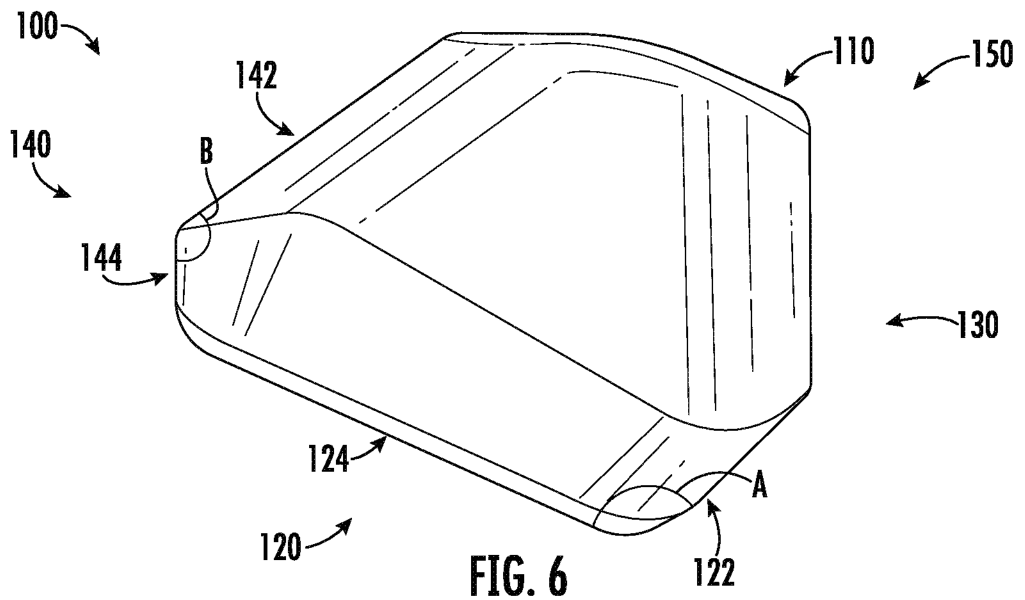
FIG. 6 is a left side view of the grip of FIG. 1.
Figure 7:
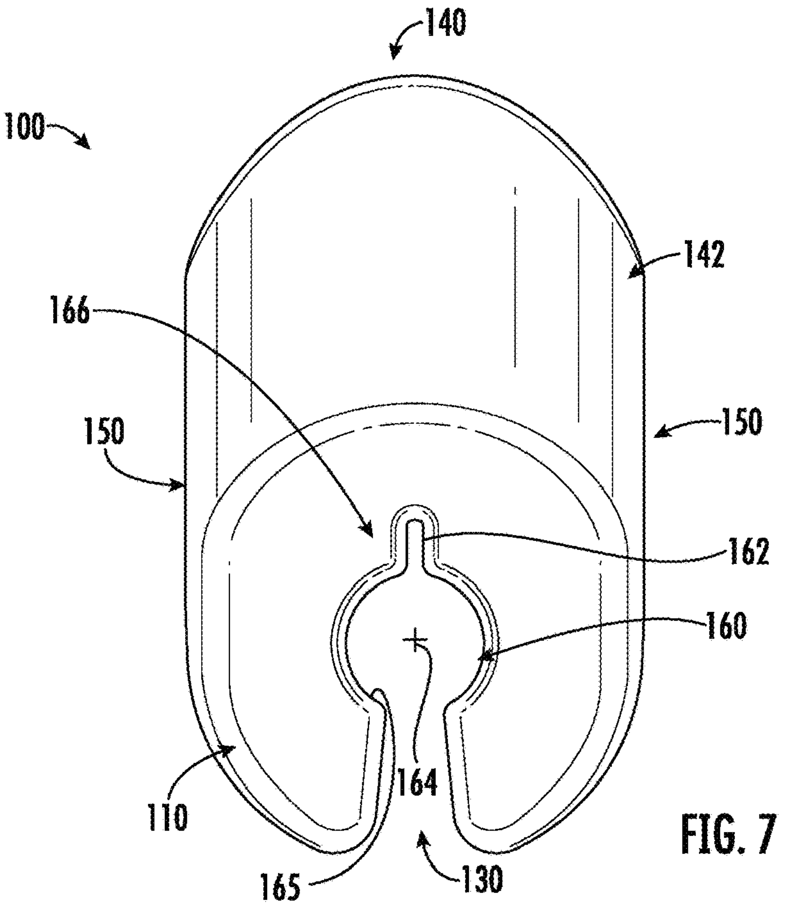
FIG. 7 is a top view of the grip of FIG. 1.
Figure 8:
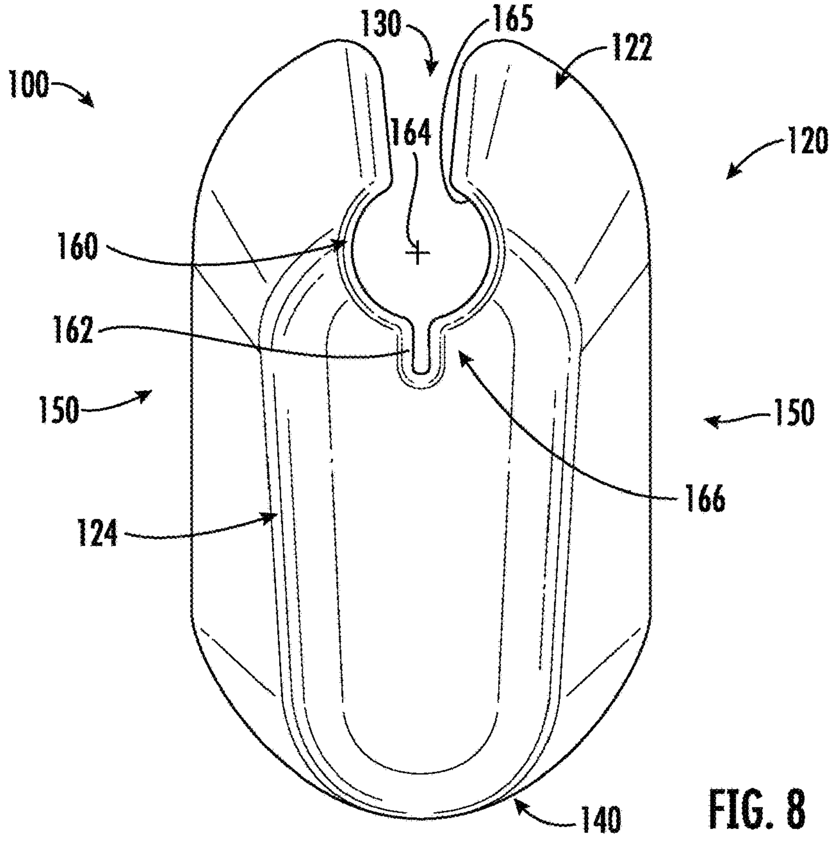
FIG. 8 is a bottom view of the grip of FIG. 1.
Figure 9:
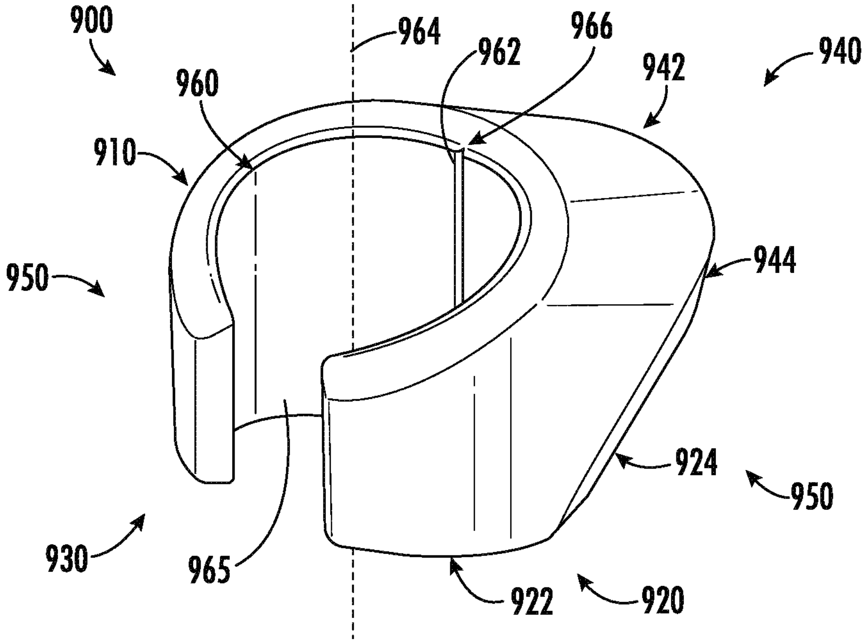
FIG. 9 is a perspective view of a grip, according to an exemplary embodiment.
Figure 10:
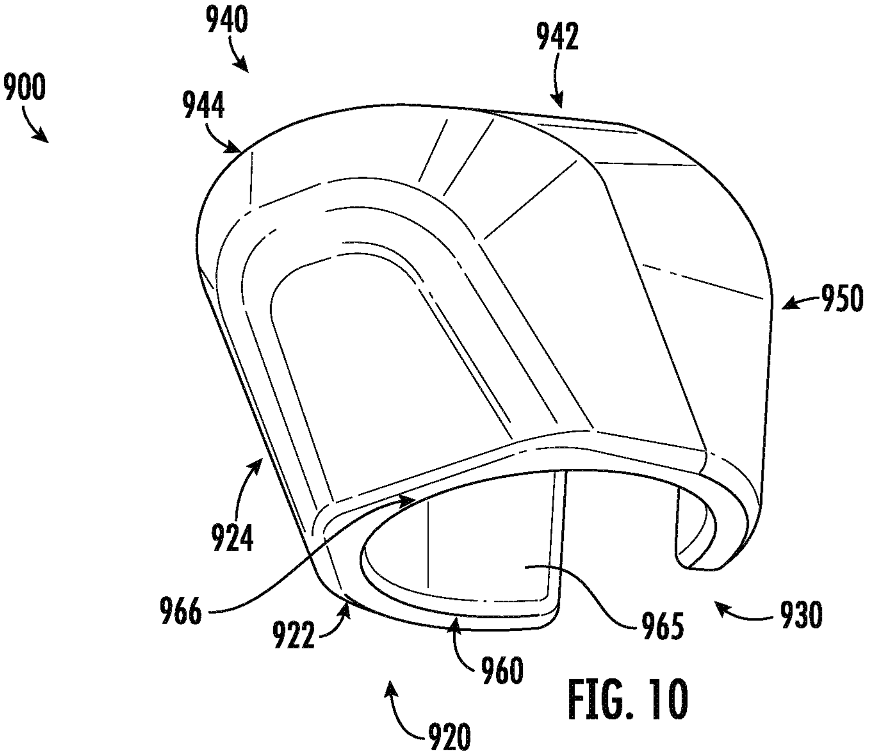
FIG. 10 is a perspective view of the grip of FIG. 9.
Figure 11:
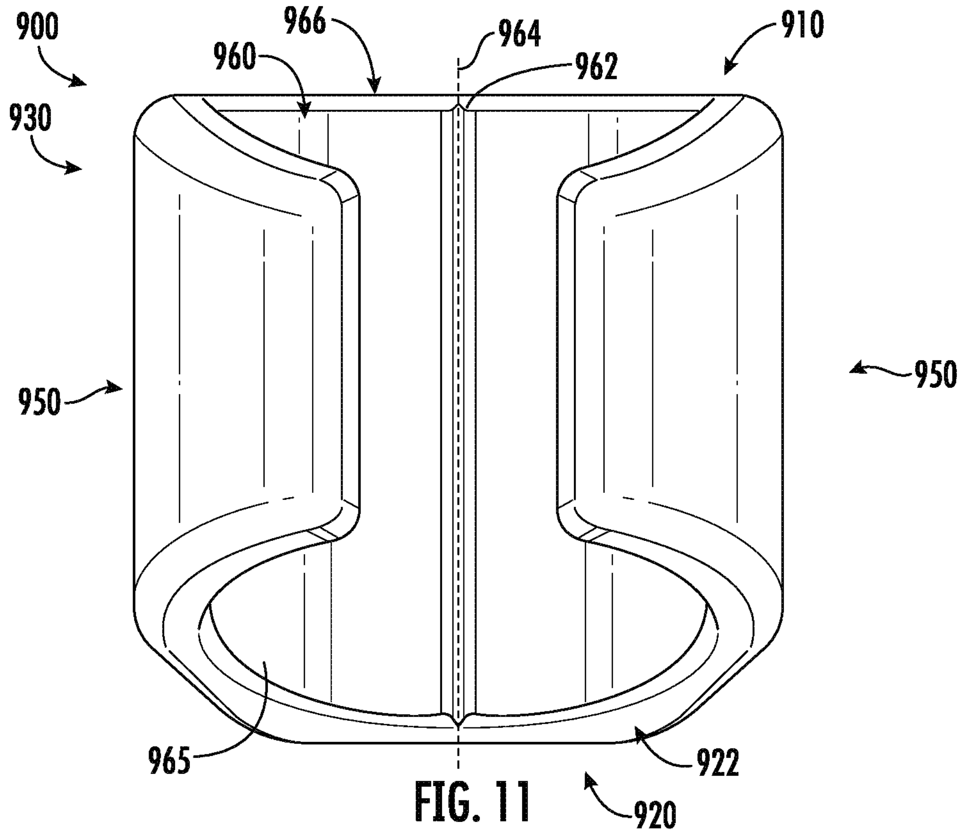
FIG. 11 is a front view of the grip of FIG. 9.
Figure 12:
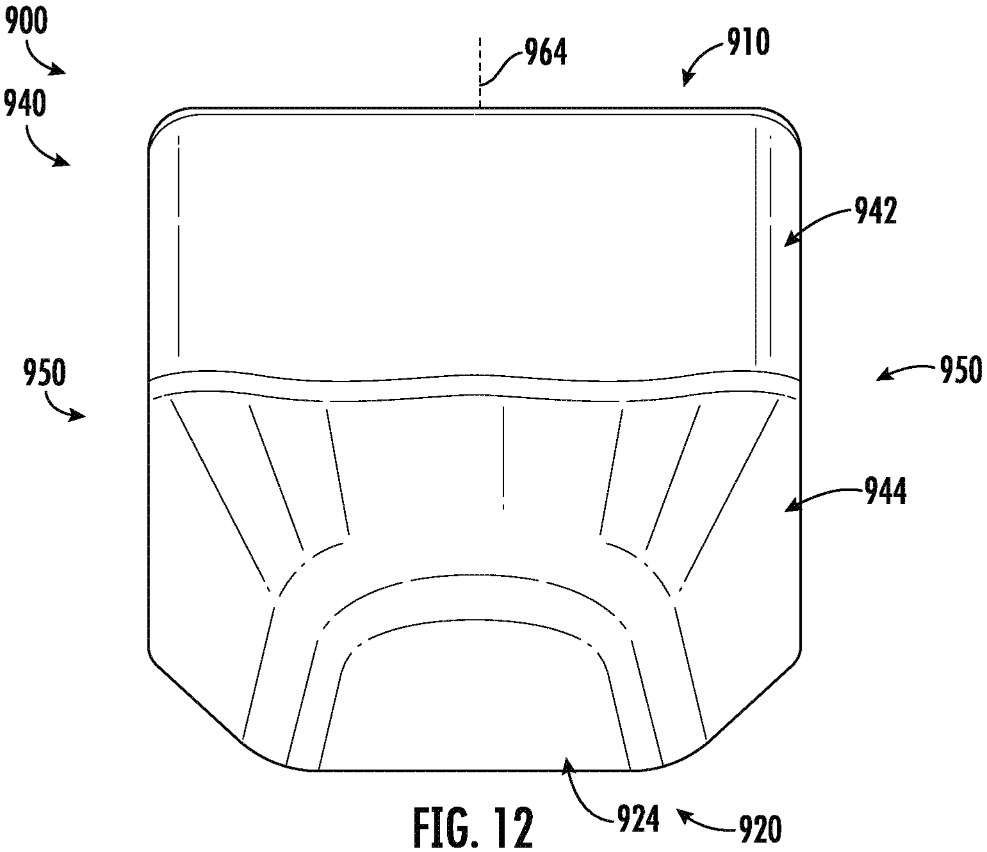
FIG. 12 is a rear view of the grip of FIG. 9.

The bottom side 120 includes a first angled portion, shown as first portion 122, and a second angled portion, shown as second portion 124. As shown in FIGS. 5 and 6, the first portion 122 is oriented at an angle A (e.g., an obtuse angle) relative to the second portion 124. The first portion 122 slopes inwardly from and is continuous with the front side 130 and forms an obtuse angle A with the second portion 124. The second portion 124 is continuous with the back side 140. In the illustrated embodiment, the first portion 122 and the second portion 124 of the bottom side 120 extend downwardly (e.g., in an opposite direction from the top side 110). For example, the first portion 122 extends downward from the front side 130 and the second portion 124 extends downward from the back side 140 and form a convex shape such that the grip 100 has a greater height or thickness where the first portion 122 and second portion 124 join compared to a height or thickness of the front side 130 or back side 140 (e.g., see FIGS. 5 and 6). In some embodiments, the first portion 122 is oriented at an angle (e.g., an acute angle) relative to the top side 110. In some embodiments, the second portion 124 of the bottom side 120 is substantially parallel to the top side 110 of the grip.

The channel 160 extends from the top side 110 to the bottom side 120. The channel 160 includes a relief slot 162, a channel base 166, and a channel surface 165. The channel 160 is configured to receive the hand-held instrument. According to an exemplary embodiment, the relief slot 162 is positioned at the channel base 166 of the channel 160. The relief slot 162 is configured to expand (e.g., open, bend to expand the channel 160) such that the channel 160 receives the hand-held instrument. For example, when the relief slot 162 contracts, the hand-held instrument can be coupled to the grip 100 within the channel 160. In particular, the hand-held instrument can contact at least a portion of the channel surface 165 within the channel 160, where frictional force or some other engagement between the channel surface 165 and the hand-held instrument can secure the hand-held instrument within the channel 160. In some embodiments, the relief slot 162 extends from the top side 110 to the bottom side 120. In some embodiments, the relief slot 162 extends along a portion or partial length of the channel 160.

The grip 100 can include an instrument axis 164. For example, the instrument axis 164 can extend through (e.g., within) the channel 160. The channel 160 can define the instrument axis 164. For example, the instrument axis 164 can be substantially coincident with a center of the channel 160 (e.g., see FIGS. 1, 3, 4, 7, and 8). In some embodiments, the instrument axis 164 lies on a lateral or central plane (e.g., see FIG. 3), which extends through the grip 100 (e.g., from the front side 130 to the back side 140). The instrument axis 164 defines a path along which the hand-held instrument can be received and coupled within the channel 160. In some embodiments, the channel 160 extends from the top side 110 to the bottom side 120. In such embodiments, the hand-held instrument extends through the top side 110 (e.g., a plane defined by at least a portion of the top side 110) and the bottom side 120 (e.g., a plane defined by at least a portion of the bottom side 120). In some embodiments, a diameter or thickness of the channel 160 varies along the length of the channel 160. For example, the diameter or thickness of the channel towards the top side 110 may be larger or smaller than the diameter or thickness of the channel towards the bottom side 120. In other embodiments, the diameter or thickness of the channel 160 can be variable or irregular along the length of the channel 160. In some embodiments, the channel surface 165 can include a substantially smooth surface. In other embodiments, the channel surface 165 can include an irregular or patterned surface including one or more protrusions, grooves, slots, dimples, impressions, or other features extending from or extending into the channel surface 165. For example, the channel surface 165 can include a dimpled surface to magnify or otherwise enhance an engagement between the hand-held instrument and the channel 160 to secure the hand-held instrument with the grip 100.

As shown in FIG. 1-8, the front side 130 of the grip 100 is continuous with the first portion 122 of the bottom side 120 and with each lateral side 150. In some embodiments, the front side 130 is defined by an opening connected with the channel 160. In such embodiments, the channel 160 is accessible from the front side 130 and the first portion 122 of the bottom side 120. In other embodiments, the channel 160 may be accessible from the back side 140 or either lateral 150. In some embodiments, the front side 130 is substantially parallel to the instrument axis 164.

In some embodiments, the grip 100 can include a through-hole (e.g., an aperture) instead of the channel 160. For example, the front side 130 of the grip 100 may define a front surface of the grip 100, and the through-hole may extend from the top side 100 through the bottom side 120. In some embodiments, the through-hole may include the relief slot 162. In such embodiments, the relief slot 162 may extend along a portion or partial length of the through-hole. In some embodiments, the instrument axis 164 can extend through (e.g., within) the through-hole. In such embodiments, the through-hole may define the instrument axis 164. For example, the instrument axis 164 can be substantially coincident with a center of the through-hole.

The front side 130 is configured to engage one or more fingers of a user's hand. For example, as the user grasps the grip 100, one or more fingers of the user's hand may engage the front side 130, allowing the user to securely hold the grip 100. More specifically, the user's second digit (e.g., an index finger) and/or the user's third digit (e.g., a middle finger) can grasp the front side 130. Further, the anterior side (e.g., toward the user's palm) of the second digit and the third digit can engage the front side 130 of the grip 100. For example, the user's palm may engage the back side 140 of the grip 100 as one or more fingers of the user's hand engage the front side 130. More specifically, the user may secure or grasp the grip 100 in the user's hand by engaging and supporting the front side 130, the back side 140 and the lateral sides 150 with one or more of the one or more fingers of user's hand and/or the palm of the user's hand, as will be described in further detail below.

The back side 140 includes a first angled portion, shown as first portion 142, and a second angled portion, shown as second portion 144. As shown in FIGS. 5 and 6, the first portion 142 is oriented at an angle B (e.g., an obtuse angle) relative to the second portion 144. The first portion 142 slopes down from and is continuous with the top side 110 and forms an obtuse angle B with the second portion 144, which is continuous with the second portion 124 of the bottom side 120. In some embodiments, the first portion 142 of the back side 140 is oriented at an angle (e.g., an obtuse angle) relative to the top side 110. In some embodiments, the second portion 144 of the back side 140 is oriented at an angle (e.g., an obtuse angle) relative to the second portion 124 of the bottom side 120. In some embodiments, the first portion 142 of the back side 140 is substantially parallel to the first portion 122 of the bottom side 120 (e.g., see FIGS. 5 and 6).

As shown in FIGS. 1-8, the lateral side 150 includes the left side and the right side of the grip 100 (e.g., with respect to the orientation of the grip 100 shown in the FIGS. 1-8). It should be noted that the grip 100 may be used in the user's dominant hand or non-dominant hand (e.g., the user's left hand or the user's right hand). The lateral side 150 is configured to support a portion of a user's thumb. By way of example, a user holding the grip 100 in their hand such that the palm of their hand engages the back side 140 of the grip may position or secure the grip 100 within their hand by engaging their thumb with the lateral side 150. More specifically, the user's thumb can curl around (e.g., wrap around, bend over, or otherwise engage with) the lateral side 150 of the grip 100 to support the grip 100 against the user's palm. In some embodiments, a portion of the user's thumb engages the lateral side 150 of the grip 100 and the end of the user's thumb can engage the front side 130 of the grip 100.

As described in more detail below, a user may hold the grip 100 with an attachment (e.g., attachment 2300, attachment 2400, attachment 2500, or other attachment) and/or a hand-held instrument (e.g., hand-held instrument 2350 or other hand-held instrument). More specifically, the palm of the user's hand can engage the back side 140 of the grip 100 as one or more fingers engage the front side 130 of the grip 100. Additionally, in some embodiments, one or more fingers of the user's hand may engage the top side 110 and at least one of the lateral sides 150 of the grip 100. The engagement of the user's hand with the grip 100 may substantially similar to the engagement of the user's hand with other grips and is described in more detail below (e.g., see FIGS. 32-34).

FIGS. 9-16 show a grip 900. The grip 900 can be a hand-held device, an assistive grip, or some other grip for a hand-held instrument. The grip 900 can be similar, in some respects, to the grip 100 with like components being described in a similar manner with similar terms to the components of the grip 100. Further, the user can interact with the grip 900 similarly, in some respects, to the grip 100 with the user engaging like components in a similar manner to the user engaging the components of grip 100. As such, the one or more sides of the grip 900 include a first or top side 910, an opposing second side, shown as bottom side 920, a front side 930, a back side 940, a right or first lateral side and a left or second lateral side, each shown as lateral side 950, and a channel 960. In some embodiments, the one or more sides of the grip 900 are continuous and are distinguishable by a contour or shape of the grip 900. In other embodiments, a discrete, defined, or hard edge can separate two or more of the sides of the grip 900.

Figure 13:
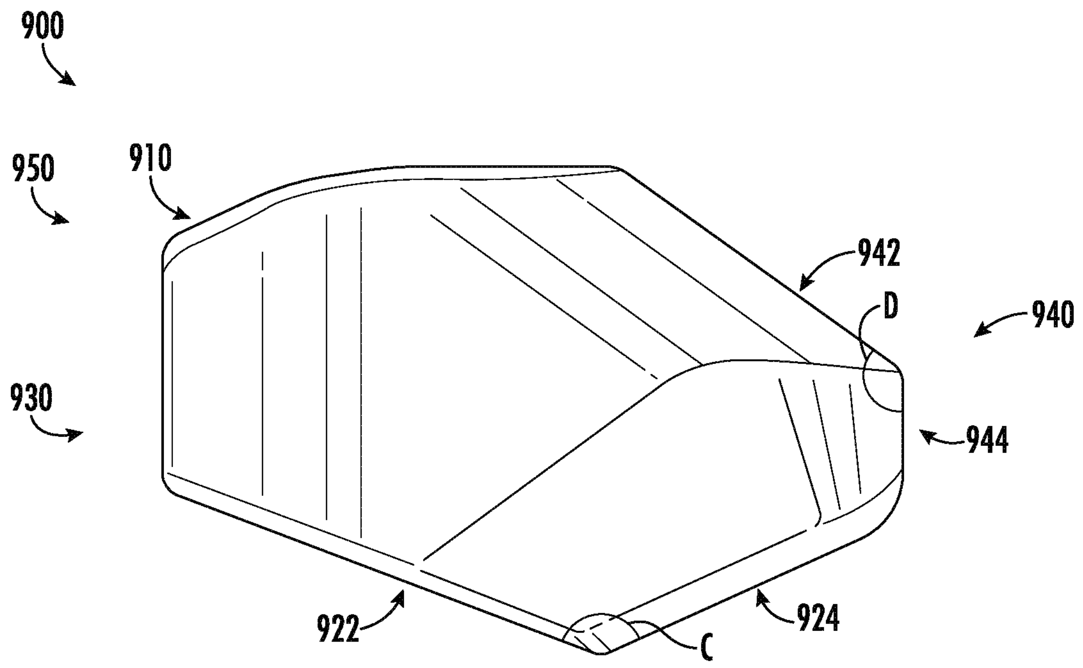
FIG. 13 is a right side view of the grip of FIG. 9.
Figure 14:
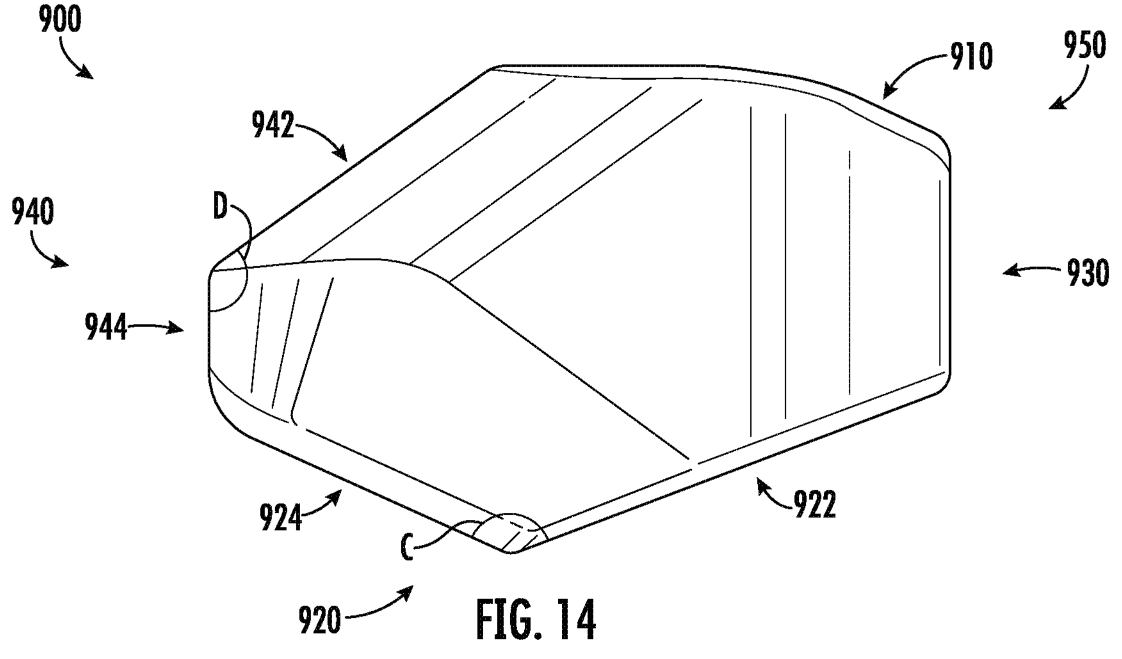
FIG. 14 is a left side view of the grip of FIG. 9.
Figure 15:
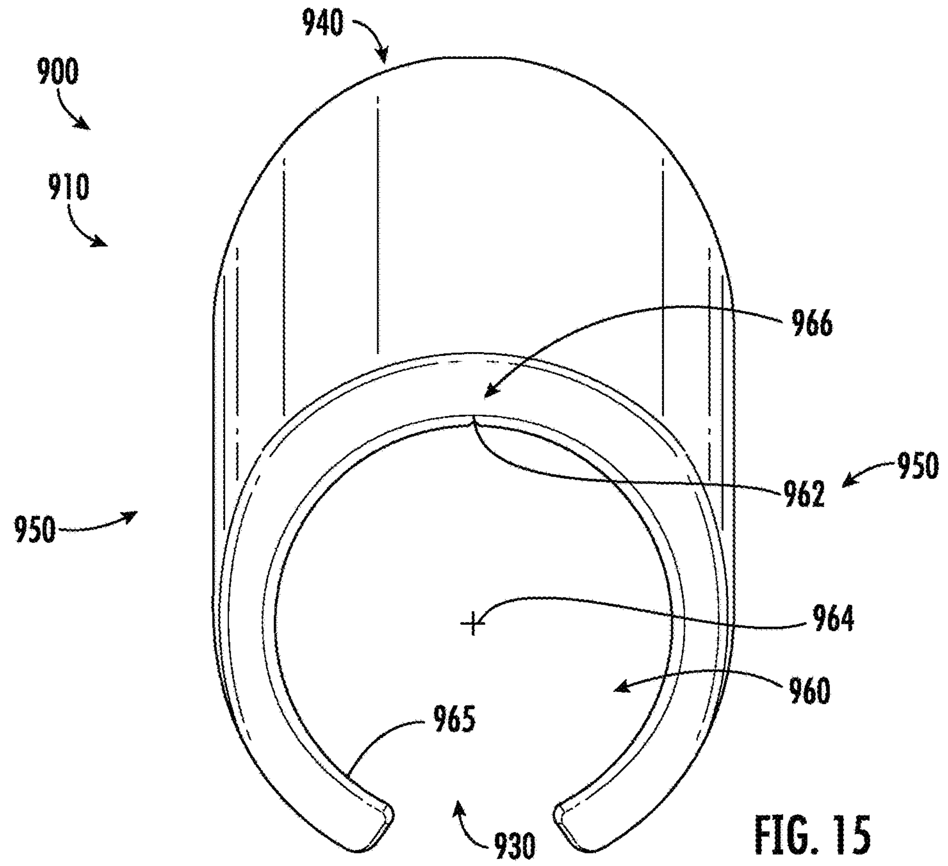
FIG. 15 is a top view of the grip of FIG. 9.
Figure 16:
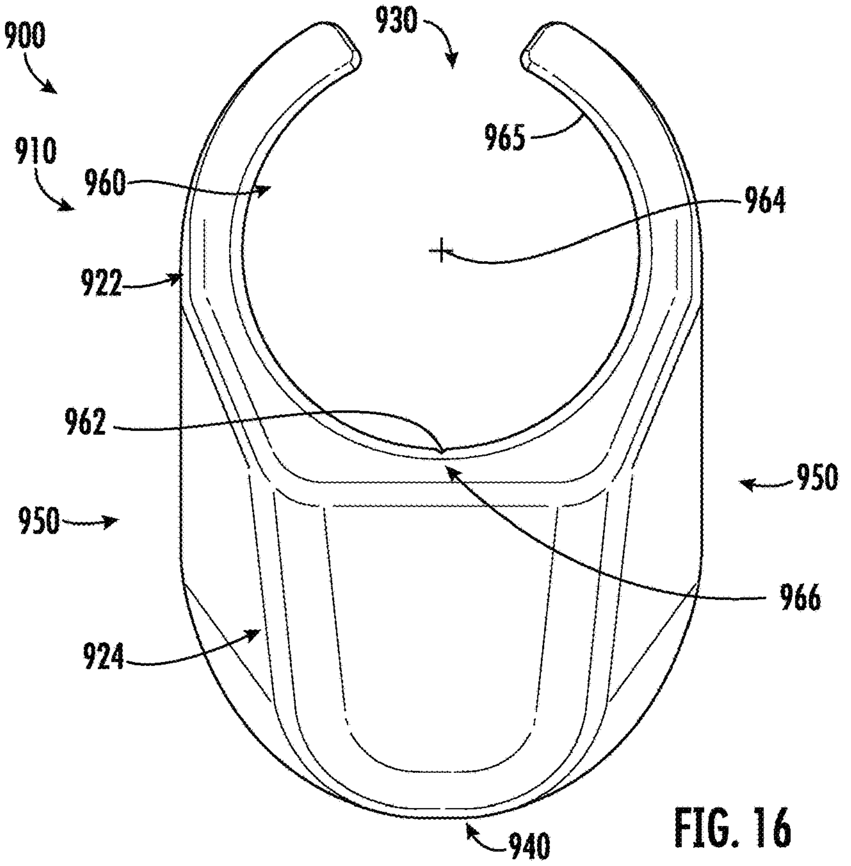
FIG. 16 is a bottom view of the grip of FIG. 9.
Figure 17:
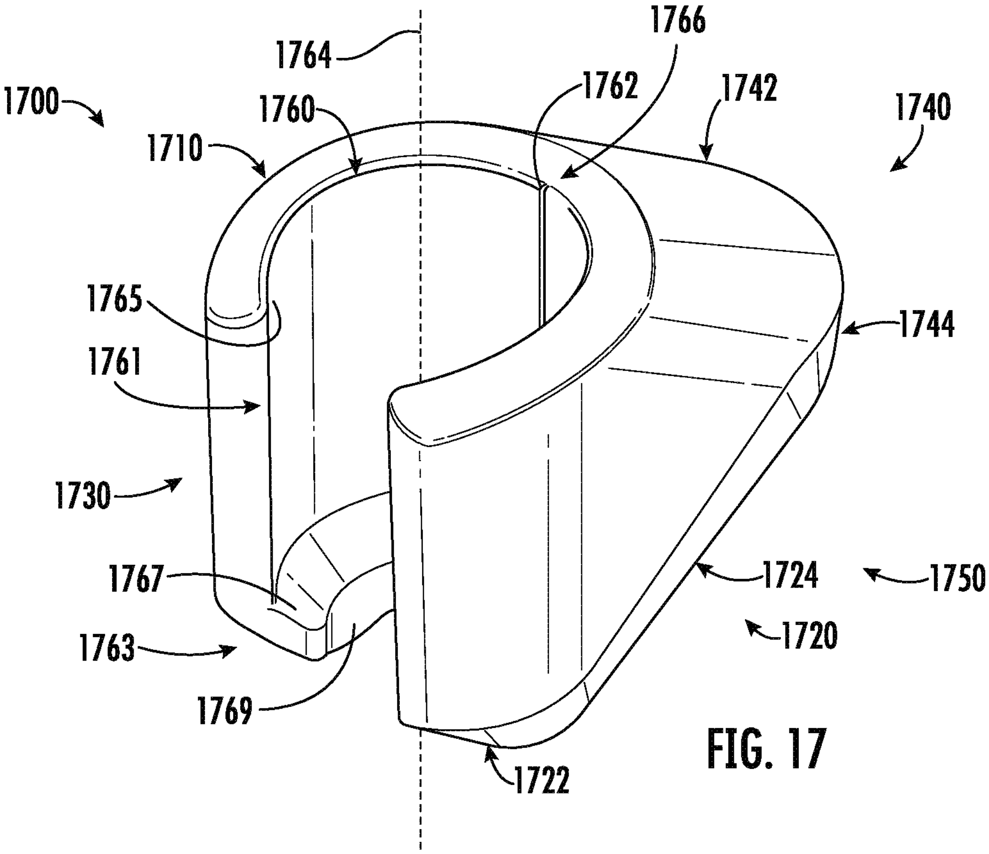
FIG. 17 is a perspective view of a grip, according to an exemplary embodiment.
Figure 18:
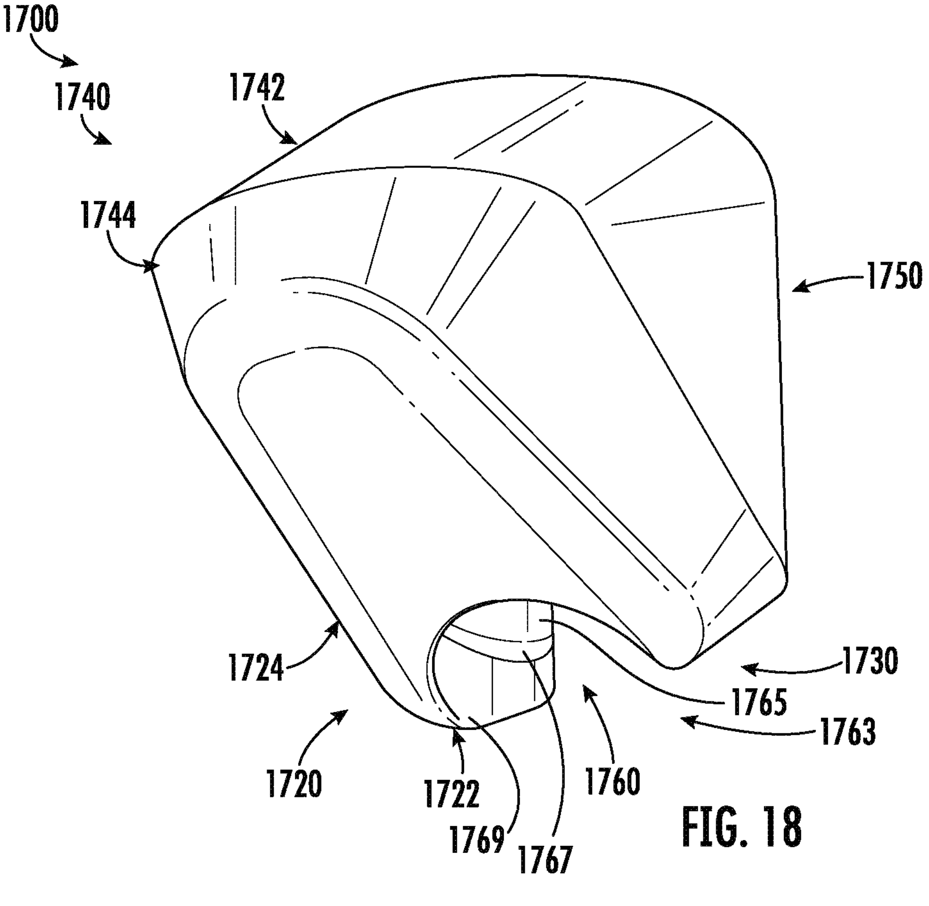
FIG. 18 is a perspective view of the grip of FIG. 17.

The bottom side 920 includes a first angled portion, shown as first portion 922, and a second angled portion, shown as second portion 924. As shown in FIGS. 13 and 14, the first portion 922 is oriented at an angle C (e.g., an obtuse angle) relative to the second portion 924. The first portion 922 slopes inwardly from and is continuous with the front side 930 and forms an obtuse angle C with the second portion 924. The second portion 924 is continuous with the back side 940. In the illustrated embodiment, the first portion 922 and the second portion 924 of the bottom side 920 extend downwardly (e.g., in an opposite direction from the top side 910). For example, the first portion 922 extends downward from the front side 930 and the second portion 924 extends downward from the back side 940 and form a convex shape such that the grip 900 has a greater height or thickness where the first portion 922 and second portion 924 join compared to a height or thickness of the front side 930 or back side 940 (e.g., see FIGS. 13 and 14).

The channel 960 extends from top side 910 to the bottom side 920. The channel 960 includes a relief slot 962, a channel base 966, and a channel surface 965. The channel 960 is configured to receive the hand-held instrument. According to an exemplary embodiment, the relief slot 962 is positioned at the channel base 966 of the channel 960. The relief slot 962 is configured to expand (e.g., open, bend to expand the channel 960) such that the channel 960 receives the hand-held instrument. For example, when the relief slot 962 contracts, the hand-held instrument can be coupled to the grip 900 within the channel 960. In particular, the hand-held instrument can contact at least a portion of the channel surface 965 within the channel 960, where frictional force or some other engagement between the channel surface 965 and the hand-held instrument can secure the hand-held instrument within the channel 960.

The grip 900 can include an instrument axis 964. For example, the instrument axis 964 can extend through (e.g., within) the channel 960. The channel 960 can define the instrument axis 964. For example, the instrument axis 964 can be substantially coincident with a center of the channel 960 (e.g., see FIGS. 9, 11, 12, 15, and 16). In some embodiments, the instrument axis 964 lies on a lateral or central plane (e.g., see FIG. 12), which extends through the grip 900 (e.g., from the front side 930 to the back side 940). The instrument axis 964 defines a path along which the hand-held instrument can be received and coupled within the channel 960. In some embodiments, the channel 960 extends from the top side 910 to the bottom side 920. In such embodiments, the hand-held instrument extends through the top side 910 (e.g., a plane defined by at least a portion of the top side 910) and the bottom side 920 (e.g., a plane defined by at least a portion of the bottom side 920).

As shown in FIG. 9-16, the front side 930 of the grip 900 is continuous with the first portion 922 of the bottom side 920 and with each lateral side 950. The front side 930 is configured to engage one or more fingers of a user's hand. For example, as the user grasps the grip 900, one or more fingers of the user's hand may engage the front side 930, allowing the user to securely hold the grip 900. The back side 940 includes a first angled portion, shown as first portion 942, and a second angled portion, shown as second portion 944. As shown in FIGS. 13 and 14, the first portion 942 is oriented at an angle D (e.g., an obtuse angle) relative to the second portion 944. The first portion 942 slopes down from and is continuous with the top side 110 and forms an obtuse angle D with the second portion 944, which is continuous with the second portion 924 of the bottom side 920. The lateral side 950 includes the left side and the right side of the grip 900 (e.g., with respect to the orientation of the grip 900 shown in the FIGS. 9-16). The lateral side 950 is configured to support a portion of a user's thumb. By way of example, a user holding the grip 900 in their hand such that the palm of their hand engages the back side 940 of the grip may position or secure the grip 900 within their hand by engaging their thumb with the lateral side 950.

According to the illustrated embodiments shown in FIG. 9-16, the grip 900 can include similar and differentiating features and/or aspects relative to the grip 100. By way of example, the channel 160 of the grip 100 defines a first or smaller diameter, and the channel 960 of the grip 900 defines a second or larger diameter. The first diameter defined by the channel 160 is configured to receive a hand-held instrument sized and shaped for the first diameter (e.g., a thinner or slimmer tool or instrument). The second diameter defined by the channel 960 is configured to receive a hand-held instrument sized and shaped for the second diameter (e.g., a wider tool or instrument). By way of another example, the relief slot 162 of the channel 160 defines a first distance into the grip 100, and the relief slot 962 of the channel 960 defines a second distance into the grip 900. The first distance of the relief slot 162 allows for a first amount of expansion of the channel 160, and the second distance of the relief slot 962 allows for a second amount of expansion of the channel 960. By way of another example, the first portion 122 of the bottom side 120 of the grip 100 surrounds or is continuous with a portion of the channel 160 while the first portion 922 of the bottom side 920 of the grip 100 surrounds or is continuous with an entirety (e.g., the entirety of the channel surface 965) of the channel 960.

FIGS. 17-24 show a hand-held device, an assistive grip, or a grip for a hand-held instrument, shown as grip 1700, according to an exemplary embodiment. The grip 1700 can be, in some respects, similar to the grip 100 and the grip 900 with like components being described in a similar manner with like terms to the components of the grip 100 and the grip 900. Further, the user can interact with the grip 1700 similarly, in some respects, to the grip 100 and the grip 900 with the user engaging like components in a similar manner to the user engaging the components of the grip 100 and the grip 900. As such, the one or more sides of the grip 1700 include a first or top side 1710, an opposing second side, shown as bottom side 1720, a front side 1730, a back side 1740, a right or first lateral side and a left or second lateral side, each shown as lateral side 1750, and a channel 1760. In some embodiments, the one or more sides of the grip 1700 are continuous and are distinguishable by a contour or shape of the grip 1700. In other embodiments, a discrete, defined, or hard edge can separate two or more of the sides of the grip 1700.

Figure 19:
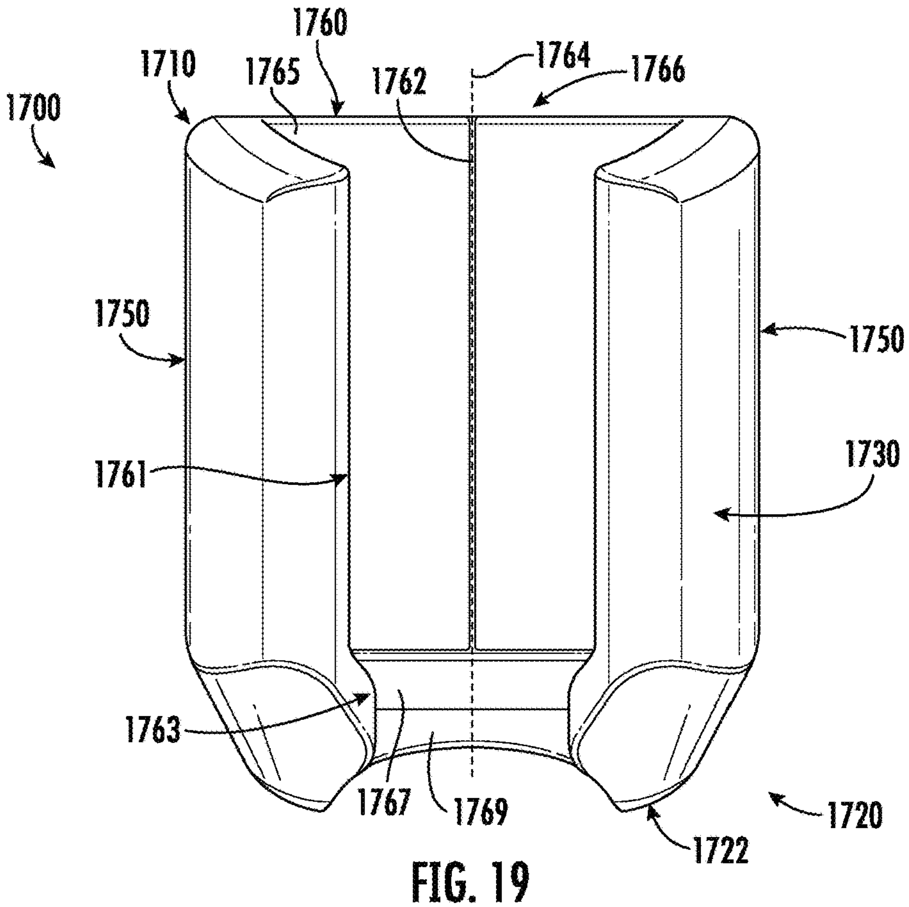
FIG. 19 is a front view of the grip of FIG. 17.
Figure 20:
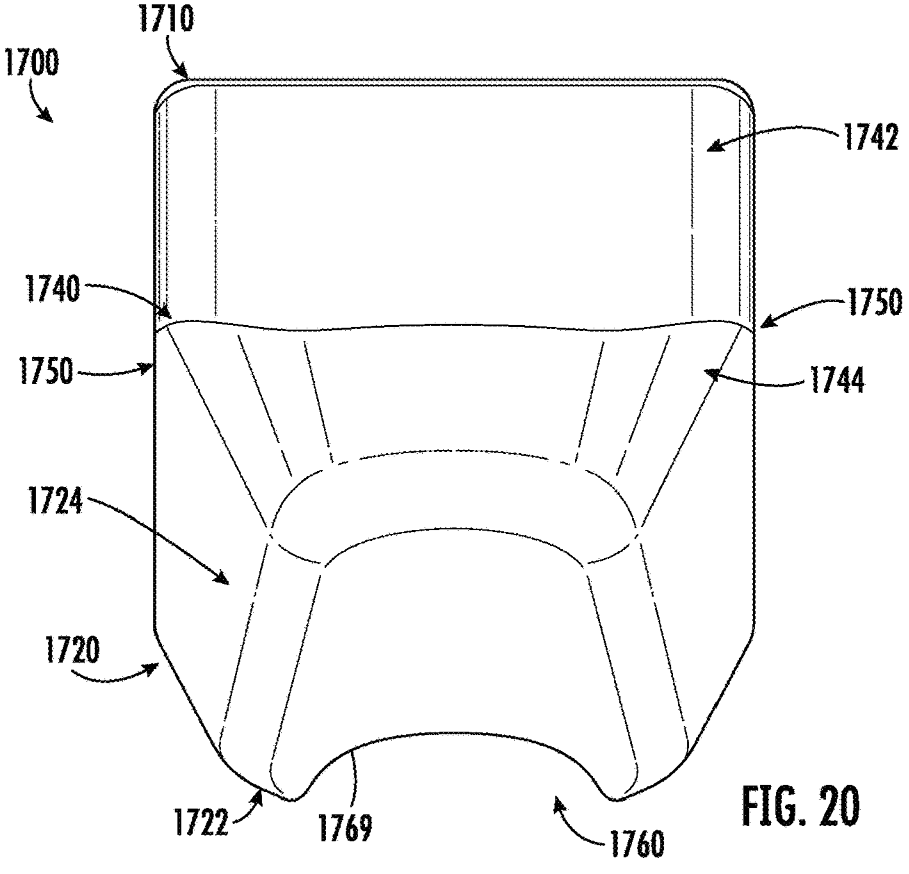
FIG. 20 is a rear view of the grip of FIG. 17.

The bottom side 1720 includes a first angled portion, shown as first portion 1722, and a second angled portion, shown as second portion 1724. As shown in FIGS. 19 and 20, the first portion 1722 is oriented at an angle E (e.g., an obtuse angle) relative to the second portion 1724. The first portion 1722 slopes inwardly from and is continuous with the front side 1730 and forms an obtuse angle E with the second portion 1724. The second portion 1724 is continuous with the back side 1740. In the illustrated embodiment, the first portion 1722 and the second portion 1724 of the bottom side 1720 extend downwardly (e.g., in an opposite direction from the top side 1710). For example, the first portion 1722 extends downward from the front side 1730 and the second portion 1724 extends downward from the back side 1740 and form a convex shape such that the grip 1700 has a greater height or thickness where the first portion 1722 and second portion 1724 join compared to a height or thickness of the front side 1730 or back side 1740 (e.g., see FIGS. 21 and 22).

The channel 1760 extends from top side 1710 to the bottom side 1720. The channel 1760 includes a relief slot 1762, a channel base 1766, a central or first portion 1761, and a lower or second portion 1763. The first portion 1761 includes a first channel surface 1765. The second portion 1763 includes a second channel surface 1767 and a third channel surface 1769. The channel 1760 is configured to receive the hand-held instrument. According to an exemplary embodiment, the relief slot 1762 is positioned at the channel base 1766 of the channel 1760. The relief slot 1762 is configured to expand (e.g., open, bend to expand the channel 160) such that the channel 1760 receives the hand-held instrument. For example, when the relief slot 1762 contracts, the hand-held instrument can be coupled to the grip 1700 within the channel 1760. In particular, the hand-held instrument can contact at least one of the first channel surface 1765, the second channel surface 1767, or the third channel surface 1769 within the channel 1760, where frictional force or some other engagement between the one or more of the first channel surface 1765, the second channel surface 1767, or the third channel surface 1769 and the hand-held instrument can secure the hand-held instrument within the channel 1760. In some embodiments, the first channel surface 1765 defines a first diameter of the channel 1760, and the third channel surface 1769 defines a second diameter of the channel 1760. In such embodiments, the second channel surface 1767 joins the first channel surface 1765 and the third channel surface 1969. In some embodiments, the second channel surface 1767 is sloped between the first diameter of the first channel surface 1765 and the second diameter of the third channel surface 1769. In some embodiments, the second channel surface 1767 defines a ledge or wall to limit movement of the hand-held instrument within the channel 1760 of the grip 1700.

The grip 1700 can include an instrument axis 1764. For example, the instrument axis 1764 can extend through (e.g., within) the channel 1760. The channel 1760 can define the instrument axis 1764. For example, the instrument axis 1764 is substantially coincident with a center of the channel 1760 (e.g., see FIGS. 17, 19, 20, 23, and 24). In some embodiments, the instrument axis 164 lies on a lateral or central plane (e.g., see FIG. 19), which extends through the grip 1700 (e.g., from the front side 1730 to the back side 1740). The instrument axis 1764 defines a path along which the hand-held instrument can be received and coupled within the channel 1760. In some embodiments, the channel 1760 extends from the top side 1710 to the bottom side 1720. In such embodiments, the hand-held instrument extends through the top side 1710 (e.g., a plane defined by at least a portion of the top side 1710) and the bottom side 1720 (e.g., a plane defined by at least a portion of the bottom side 1720). In some embodiments, the second channel surface 1767 limits a distance the hand-held instrument can extend through the channel 1760.

Figure 21:
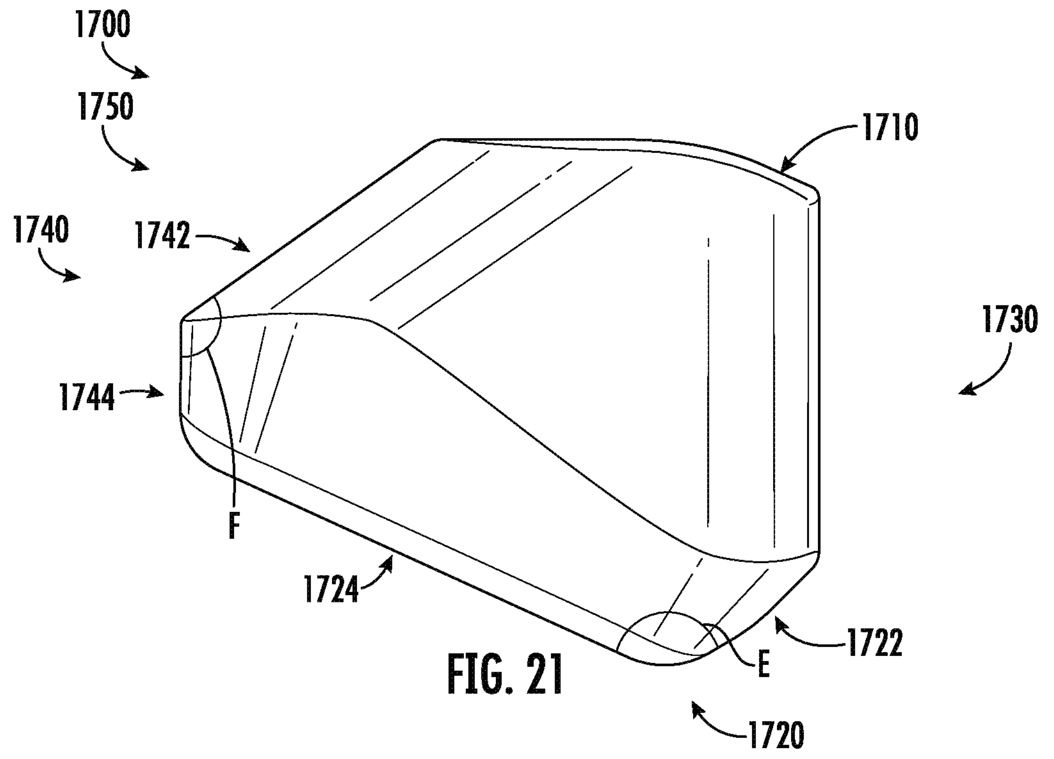
FIG. 21 is a right side view of the grip of FIG. 17.
Figure 22:
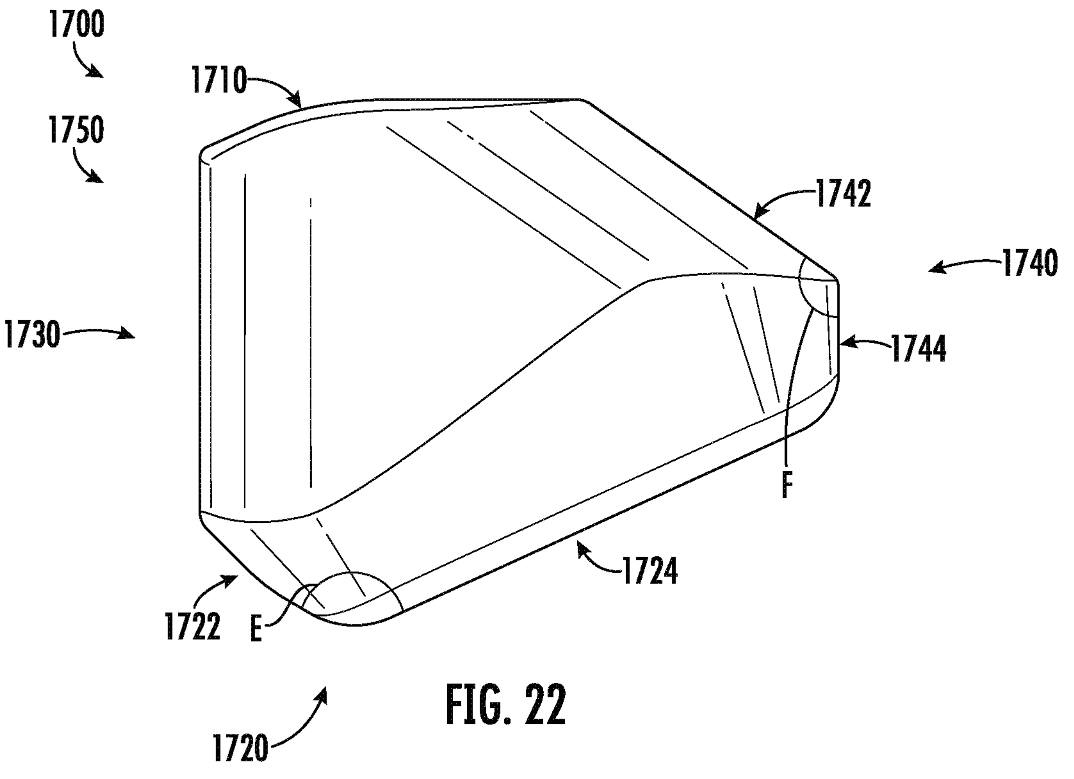
FIG. 22 is a left side view of the grip of FIG. 17.
Figure 23:
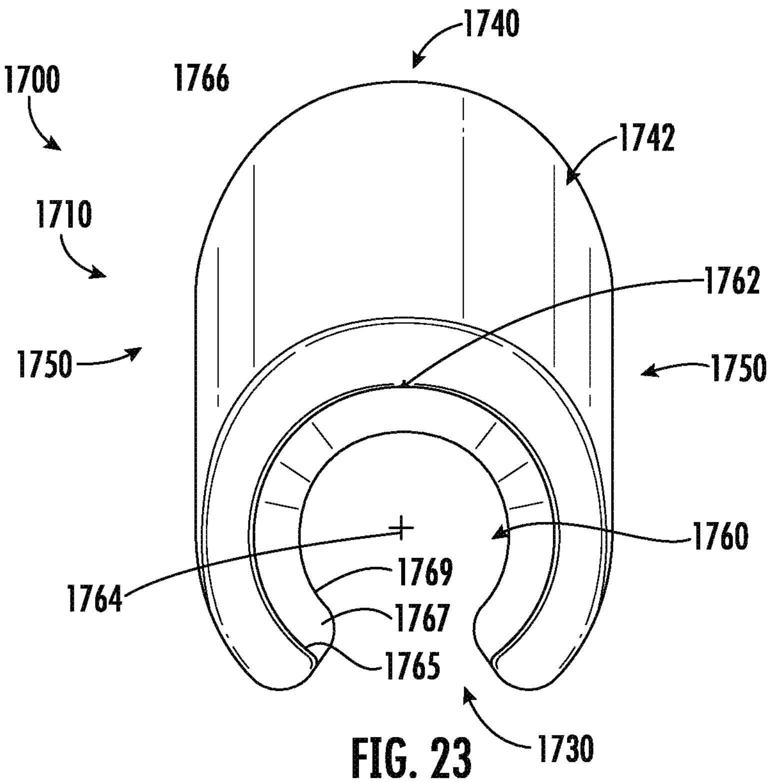
FIG. 23 is a top view of the grip of FIG. 17.

As shown in FIG. 17-24, the front side 1730 of the grip 1700 is continuous with the first portion 1722 of the bottom side 1720 and with each lateral side 1750. The front side 1730 is configured to engage one or more fingers of a user's hand. For example, as the user grasps the grip 1700, one or more fingers of the user's hand may engage the front side 1730, allowing the user to securely hold the grip 1700. The back side 1740 includes a first angled portion, shown as first portion 1742, and a second angled portion, shown as second portion 1744. As shown in FIGS. 21 and 22, the first portion 1742 is oriented at an angle F (e.g., an obtuse angle) relative to the second portion 1744. The first portion 1742 slopes down from and is continuous with the top side 1710 and forms an obtuse angle F with the second portion 1744, which is continuous with the second portion 1724 of the bottom side 1720. The lateral side 1750 includes the left side and the right side of the grip 1700 (e.g., with respect to the orientation of the grip 1700 shown in the FIGS. 17-24). The lateral side 1750 is configured to support a portion of a user's thumb. By way of example, a user holding the grip 1700 in their hand such that the palm of their hand engages the back side 1740 of the grip may position or secure the grip 1700 within their hand by engaging their thumb with the lateral side 1750.

According to the illustrated embodiments shown in FIG. 17-24, the grip 1700 can include similar and differentiating features and/or aspects relative to the grip 100 and the grip 900. By way of example, the channel 160 of the grip 100 defines a first diameter, the channel 960 of the grip 900 defines a second diameter, and the channel 1760 of the grip 1700 defines a third diameter and a fourth diameter. The first diameter defined by the channel 160 is configured to receive a hand-held instrument sized and shaped for the first diameter along the instrument axis 164. The second diameter defined by the channel 960 is configured to receive a hand-held instrument sized and shaped for the second diameter along the instrument axis 964. The third diameter and the fourth diameter defined by the channel 1760 are configured to receive a hand-held instrument sized and shaped for the third diameter and the fourth diameter along the instrument axis 1764. More specifically, a portion of the hand-held instrument can be sized for the third diameter and a portion of the hand-held instrument can be sized for the fourth diameter such that the hand-held instrument can only move a certain distance along the instrument axis 1764. By way of another example, the relief slot 162 of the channel 160 extends a first distance along the channel base 166, the relief slot 962 of the channel 960 extends a second distance along the channel base 966, and the relief slot 1762 extends a third distance along the channel base 1766. The first distance of the relief slot 162 allows for a first amount of expansion of the channel 160, the second distance of the relief slot 962 allows for a second amount of expansion of the channel 960, and the third distance of the relief slot 1762 allows for a third amount of expansion of the channel 1760. By way of another example, the first portion 922 of the bottom side 920 of the grip 100 surrounds or is continuous with an entirety (e.g., the entirety of the channel surface 965) of the channel 960 while the first portion 1722 of the bottom side 1720 of the grip 1700 surrounds or is continuous with a portion of the channel 1760.

Referring generally to FIGS. 25-31, an attachment may be received by or coupled to the grip 100, the grip 900, the grip 1700, or some other grip. The attachment allows the user to couple a hand-held instrument with a grip. By way of example, the hand-held instrument may not be shaped to fit within or be received by the channel of the grip. The attachment may be sized and/or shaped to conform with or be received by the channel of the grip. As such, the hand-held instrument may be coupled to the attachment. The attachment includes an outer portion sized to be received by the channel and an inner portion sized to be received. In some embodiments, the attachment includes a tightening assembly or one or more screws configured to secure the hand-held instrument within the inner portion of the attachment. In some embodiments, the inner portion of the attachment is textured or formed with a material (e.g., silicon, rubber, etc.) that provides friction when the hand-held instrument engages the inner portion to limit movement of the hand-held instrument relative to the attachment.

Figure 25:
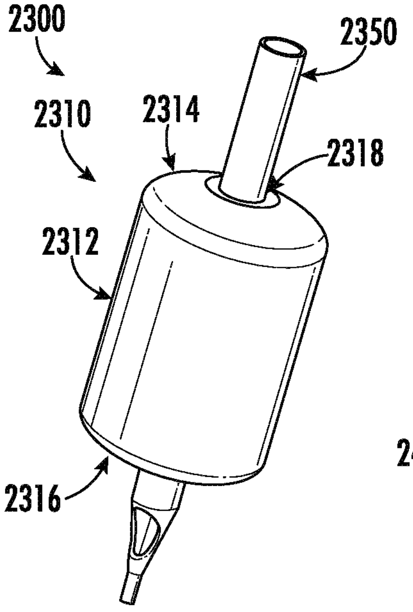
FIG. 25 is a perspective view of an attachment for a grip, according to an exemplary embodiment.

FIG. 25 shows an accessory to a grip (e.g., the grip 100, the grip 900, or the grip 1700), shown as attachment 2300, according to an exemplary embodiment. The attachment 2300 is configured to allow a user to couple a hand-held instrument to a grip. More specifically, the attachment 2300 may receive or be coupled to a hand-held instrument shaped or sized to be received by the attachment 2300. Further, the attachment 2300 may be shaped or sized to be received by a grip. The attachment 2300 includes an adapter 2310 and a drawing or writing utensil, shown as hand-held instrument 2350. The adapter 2310 includes a first or outer portion 2312 and a second or inner portion 2318 joined by a first or top side 2314 and a second or bottom side 2316. The outer portion 2312 defines a shape of the adapter that engages the channel (e.g., the channel 160, the channel 960, or the channel 1760) to secure the attachment 2300 within the grip (e.g., the grip 100, the grip 900, or the grip 1700). The inner portion 2318 receives the hand-held instrument 2350. In some embodiments, the inner portion 2318 of the attachment 2300 is textured or formed with a material (e.g., silicon, rubber, etc.) that provides friction when the hand-held instrument 2350 engages the inner portion 2318 to limit movement of the hand-held instrument 2350 relative to the adapter 2310 of the attachment 2300. The attachment 2300 can be or include the same material as a grip to which it is coupled.

Figure 26:
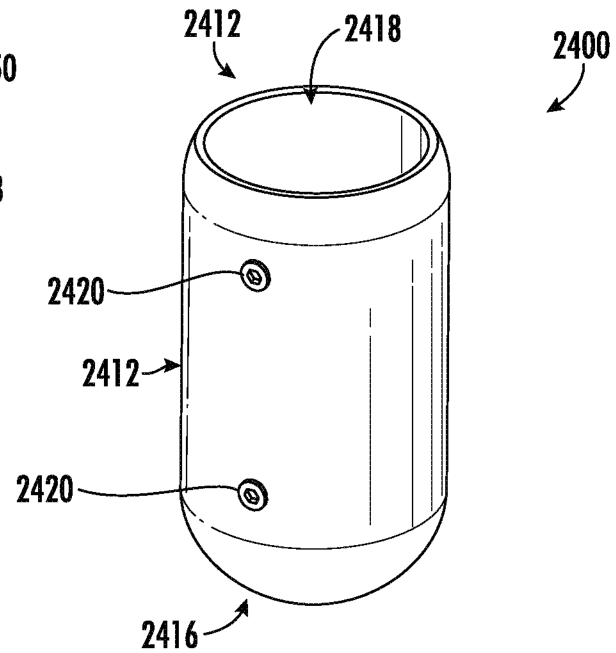
FIG. 26 is a perspective view of an attachment for a grip, according to an exemplary embodiment.

FIG. 26 shows an accessory to a grip (e.g., the grip 100, the grip 900, or the grip 1700), shown as attachment 2400, according to an exemplary embodiment. The attachment 2400 is configured to allow a user to couple a hand-held instrument to a grip. More specifically, the attachment 2400 may receive or be coupled to a hand-held instrument shaped or sized to be received by the attachment 2400. Further, the attachment 2400 may be shaped or sized to be received by a grip. The attachment 2400 includes a first or outer portion 2412 and a second or inner portion 2418 joined by a first or top side 2414 and a second or bottom side 2416. The outer portion 2412 defines a shape of the attachment that engages the channel (e.g., the channel 160, the channel 960, or the channel 1760) to secure the attachment 2400 within the grip (e.g., the grip 100, the grip 900, or the grip 1700). The outer portion 2412 includes one or more set screws, shown as screws 2420. The inner portion 2418 is sized to receive a hand-held attachment. The screws 2420 extend through the outer portion 2412 and the inner portion 2418, which receives the hand-held instrument. The screws 2420 are configured to engage the hand-held instrument to position or secure the hand-held instrument within the inner portion 2418 and limit movement of the hand-held instrument relative to the attachment 2400. The attachment 2400 can be or include the same material as a grip to which is coupled.

Figure 27:
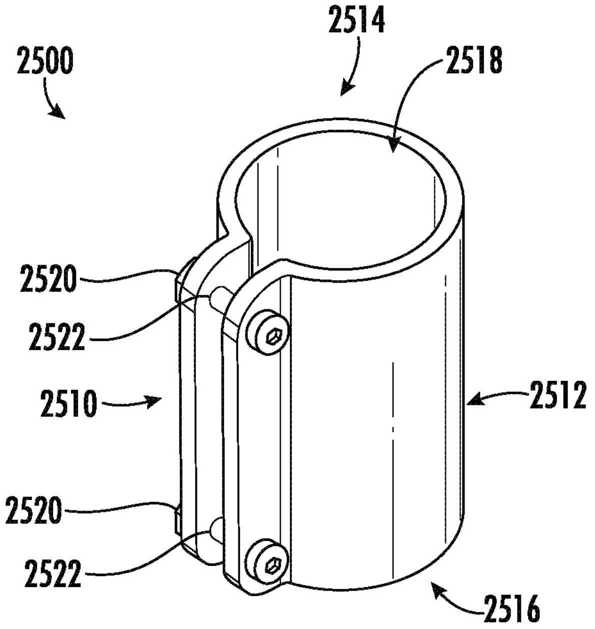
FIG. 27 is a perspective view of an attachment for a grip, according to an exemplary embodiment.

FIG. 27 shows an accessory to a grip (e.g., the grip 100, the grip 900, or the grip 1700), shown as attachment 2500, according to an exemplary embodiment. The attachment 2500 is configured to allow a user to couple a hand-held instrument to a grip. More specifically, the attachment 2500 may receive or be coupled to a hand-held instrument shaped or sized to be received by the attachment 2500. Further, the attachment 2500 may be shaped or sized to be received by a grip. The attachment 2500 includes a plurality of flanges 2510, a first or outer portion 2512 and a second or inner portion 2518 joined by a first or top side 2514 and a second or bottom side 2516. The outer portion 2512 defines a shape of the attachment that engages the channel (e.g., the channel 160, the channel 960, or the channel 1760) to secure the attachment 2500 within the grip (e.g., the grip 100, the grip 900, or the grip 1700). The inner portion 2518 is sized to receive a hand-held attachment. The plurality of flanges 2510 extend from and are continuous with the outer portion 2512 and the inner portion 2518. Each one of the plurality of flanges 2510 includes tightening assembly, shown as a screw assembly 2520 and one or more apertures, shown as flange apertures 2522. The plurality of flanges 2510 and the screw assembly 2520 are configured to secure or limit movement of a hand-held instrument relative to the grip. In some embodiments, the screw assembly 2520 includes a threaded screw and a bolt. In such embodiments, the threaded screw extends through the flange apertures 2522 and the bolt is tightened onto the threaded screw. In some embodiments, the screw assembly 2520 may be tightened to reduce a distance between the plurality of flanges 2510 to size the attachment 2500 for the hand-held instrument. In some embodiments, the screw assembly may be loosened to increase the distance between the plurality of flanges 2510 to size the attachment 2500 for the hand-held instrument. The attachment 2500 can be or include the same material as a grip to which it is coupled.

Referring to FIGS. 28-31, the attachment 2300, the hand-held instrument 2350, the attachment 2400, or the attachment 2500 may be coupled to the grip 100, the grip 900, or the grip 1700. In some embodiments, the attachment or the hand-held instrument coupled to the grip is chosen based on the hand-held instrument. In some embodiments, the attachment or the hand-held instrument coupled to the grip is chosen based on a geometry of the attachment or a geometry of the grip. In some embodiments, the attachment enables the user to couple the hand-held instrument to the grip when the hand-held instrument is not sized for the grip.

Figure 28:
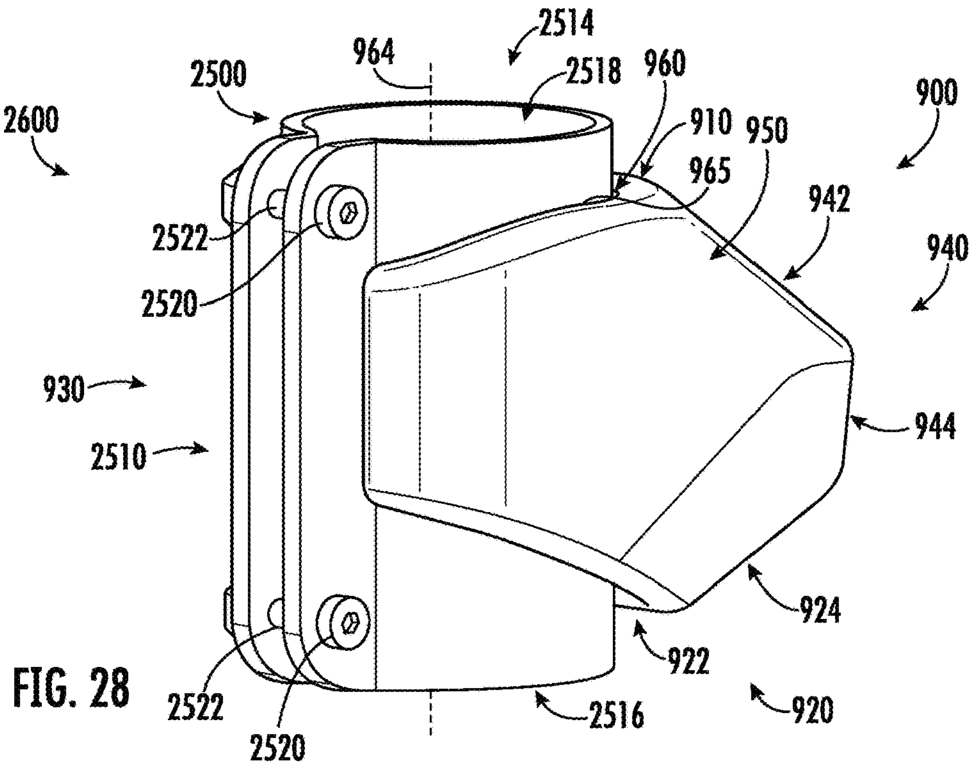
FIG. 28 is a perspective view of a grip assembly including a grip and an attachment, according to an exemplary embodiment.

FIG. 28 shows a grip assembly 2600, according to an exemplary embodiment. The grip assembly 2600 includes the grip 900 and the attachment 2500. The attachment 2500 is positioned in the channel 960 of the grip 900. In some embodiments, the attachment 2500 is inserted into the channel 960 along the instrument axis 964. In some embodiments, the attachment 2500 is inserted into the channel 960 through the front side 930 of the grip 900. In some embodiments, the relief slot 962 may move (e.g., expand) to allow the channel 960 to receive the attachment 2500. The outer portion 2512 of the attachment 2500 engages the channel surface 965 of the channel 960. In some embodiments, the hand-held instrument may be inserted into the attachment 2500 and the screw assembly 2520 may be tightened before the channel 960 receives the attachment 2500. In some embodiments, the attachment 2500 may be inserted into the channel 960 of the grip 900, and then, the hand-held instrument is inserted into the inner portion 2518 of the attachment 2500 and the screw assembly 2520 is adjusted (e.g., tightened or loosened) to secure the hand-held attachment with the grip 900.

According to the exemplary embodiment shown in FIG. 28, the user may hold the grip assembly 2600 in their hand. The grip assembly 2600 is configured to be held by the user to engage (e.g., support) a user's palm as the user grasps the grip 900 and the attachment 2500. In some embodiments, at least a portion of the palm of the user's hand engages with the back side 940. By way of example, the first portion 942 may be positioned towards an apex of the user's palm (e.g., towards the knuckles), and the second portion 944 may be positioned towards a middle or a base of the user's palm (e.g., towards the wrist). In some embodiments, at least a portion of one or more digits of the user's hand engage with the lateral sides 950. By way of example, a portion (e.g., the middle portion or some other portion) of a user's thumb may engage one of the lateral sides 950 as a portion (e.g., the middle portion or some other portion) of one or more fingers of the user's hand engage the opposing one of the lateral sides 950. In some embodiments, at least a portion of the one or more digits of the user's hand engage one or more of the front side 930 or the bottom side 920 of the grip 900 or the plurality of flanges 2510 to grasp the grip assembly 2600. By way of example, at least a portion (e.g., a top portion, an end portion, a pad, a tip, or some other portion) of the user's thumb may engage the front side 930 or the first portion 922 of the bottom side 920 of the grip 900. Further, at least a portion (e.g., a top portion, an end portion, a pad, a tip, or some other portion) of the user's one or more fingers may engage the plurality of flanges 2510 of the attachment 2500.

Figure 29:
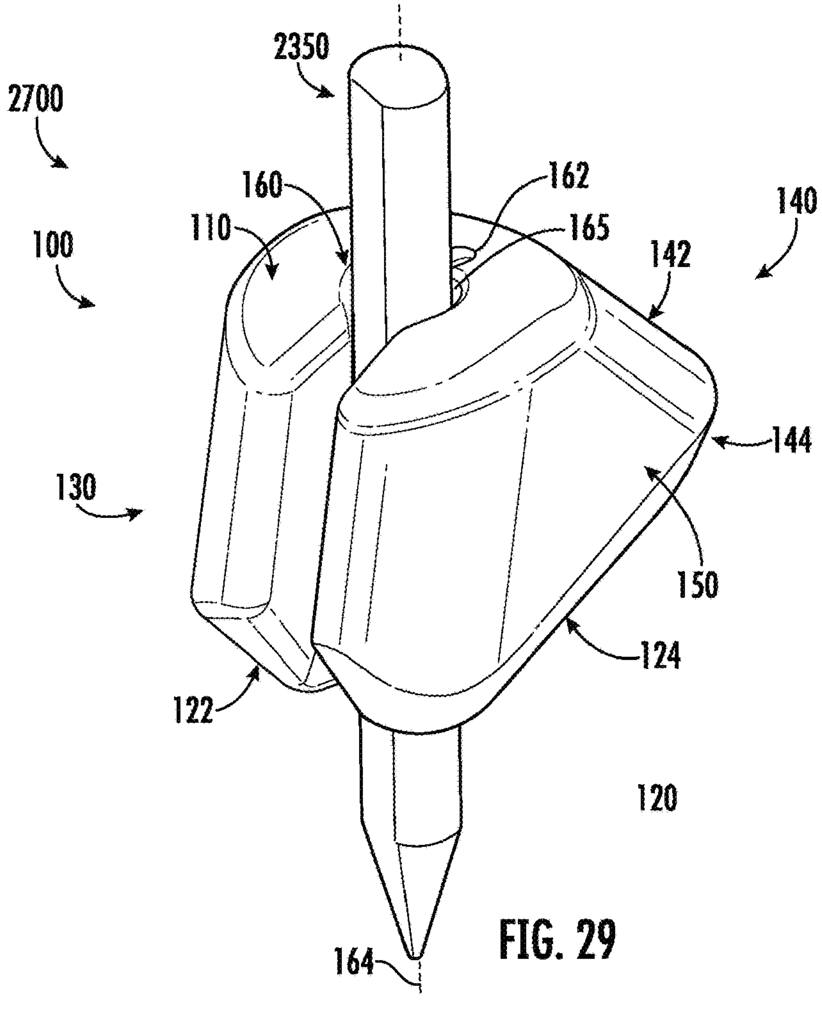
FIG. 29 is a perspective view of a grip assembly with an instrument, according to an exemplary embodiment.

FIG. 29 shows a grip assembly 2700, according to an exemplary embodiment. The grip assembly 2700 includes the grip 100 and the hand-held instrument 2350. The hand-held instrument 2350 is positioned in the channel 160 and engages the channel surface 165. In some embodiments, the hand-held instrument 2350 is inserted into the channel 160 along the instrument axis 164. In some embodiments, the hand-held instrument 2350 is inserted into the channel 160 through the front side 130 of the grip 100. In some embodiments, the relief slot 162 may move (e.g., expand) to allow the channel 160 to receive the hand-held instrument 2350. A portion (e.g., an outer portion) of the hand-held instrument 2350 engages the channel 160.

According to the exemplary embodiment shown in FIG. 29, the user may hold the grip assembly 2700 in their hand. The grip assembly 2700 is configured to be held by the user to engage (e.g., support) a user's palm as the user grasps the grip 100 and the hand-held instrument 2350. In some embodiments, at least a portion of the palm of the user's hand engages with the back side 140. By way of example, the first portion 142 may be positioned towards an apex of the user's palm (e.g., towards the knuckles), and the second portion 144 may be positioned towards a middle or a base of the user's palm (e.g., towards the wrist). In some embodiments, at least a portion of one or more digits of the user's hand engage with the lateral side 150. By way of example, a portion (e.g., the middle portion or some other portion) of a user's thumb may engage one of the lateral sides 150 as a portion (e.g., the middle portion or some other portion) of one or more fingers of the user's hand engage the opposing one of the lateral sides 150. In some embodiments, at least a portion of the one or more digits of the user's hand engage one or more of the bottom side 120 or the front side 130 of the grip 100 to grasp the grip assembly 2700. By way of example, at least a portion (e.g., a top portion, an end portion, a pad, a tip, or some other portion) of the user's thumb may engage the front side 130 and/or the first portion 122 of the bottom side 120 of the grip 100.

Figure 30:
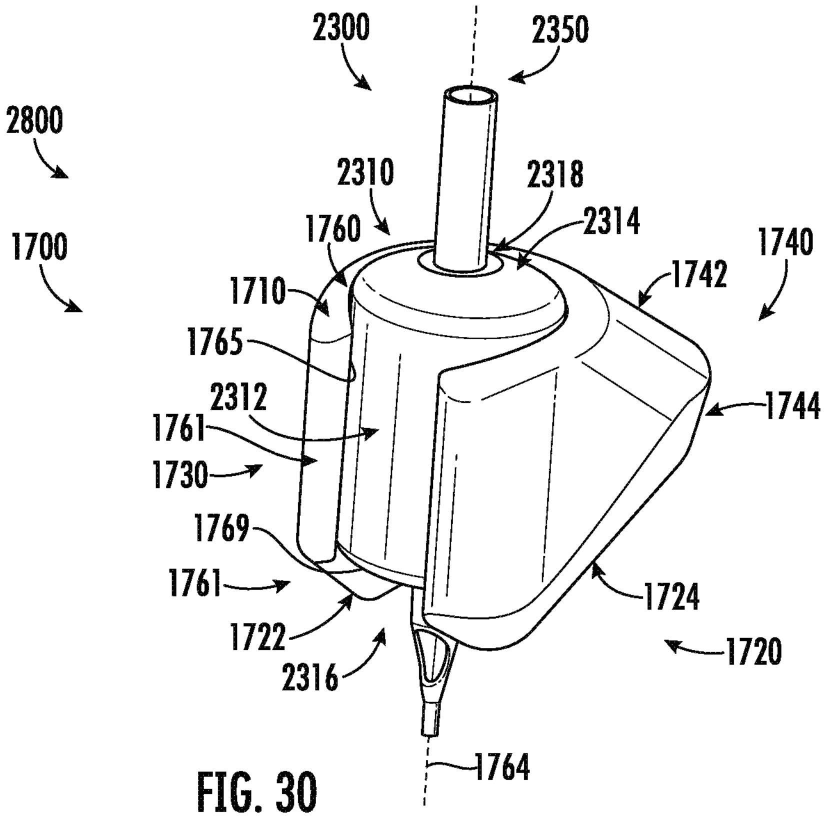
FIG. 30 is a perspective view of a grip assembly with an instrument, according to an exemplary embodiment.

FIG. 30 shows a grip assembly 2800, according to an exemplary embodiment. The grip assembly 2800 includes the grip 1700, the attachment 2300, and the hand-held instrument 2350. The attachment 2300 is positioned in the channel 1760 of the grip 1700. In some embodiments, the attachment 2300 is inserted into the channel 1760 along the instrument axis 1764. In some embodiments, the attachment 2300 is inserted into the channel 1760 through the front side 1730 of the grip 1700. In some embodiments, the relief slot 1762 may move (e.g., expand) to allow the channel 1760 to receive the attachment 2300. The outer portion 2312 of the attachment 2300 engages the first portion 1761 and the second portion 1763 of the channel 1760. More specifically, the outer portion 2312 of the attachment 2300 engages the first channel surface 1765, the second channel surface 1767, and the third channel surface 1769 of the channel 1760. In some embodiments, the hand-held instrument 2350 may be inserted into the attachment 2300 before the channel 1760 receives the attachment 2300. In some embodiments, the attachment 2300 may be inserted into the channel 1760 of the grip 1700, and then, the hand-held instrument 2350 is inserted into the inner portion 2318 of the attachment 2300 to secure the attachment 2300 with the grip 1700.

According to the exemplary embodiment shown in FIG. 30, the user may hold the grip assembly 2800 in their hand. The grip assembly 2800 is configured to be held by the user to engage (e.g., support) a user's palm as the user grasps the grip 1700, the attachment 2300, and the hand-held instrument 2350. In some embodiments, at least a portion of the palm of the user's hand engages with the back side 1740. By way of example, the first portion 1742 may be positioned towards an apex of the user's palm (e.g., towards the knuckles), and the second portion 1744 may be positioned towards a middle or a base of the user's palm (e.g., towards the wrist). In some embodiments, at least a portion of one or more digits of the user's hand engage with the lateral sides 1750. By way of example, a portion (e.g., the middle portion or some other portion) of a user's thumb may engage one of the lateral sides 1750 as a portion (e.g., the middle portion or some other portion) of one or more fingers of the user's hand engage the opposing one of the lateral sides 1750. In some embodiments, at least a portion of the one or more digits of the user's hand engage one or more of the bottom side 1720 or the front side 1730 of the grip 900 or the outer portion 2312 of the attachment 2300 to grasp the grip assembly 2800. By way of example, at least a portion (e.g., a top portion, an end portion, a pad, a tip, or some other portion) of the user's thumb may engage the first portion 1722 of the bottom side 1720 and/or the front side 1730 of the grip 1700. Further, at least a portion (e.g., a top portion, an end portion, a pad, a tip, or some other portion) of the user's one or more fingers may engage the outer portion 2312 of the attachment 2300.

Figure 31:
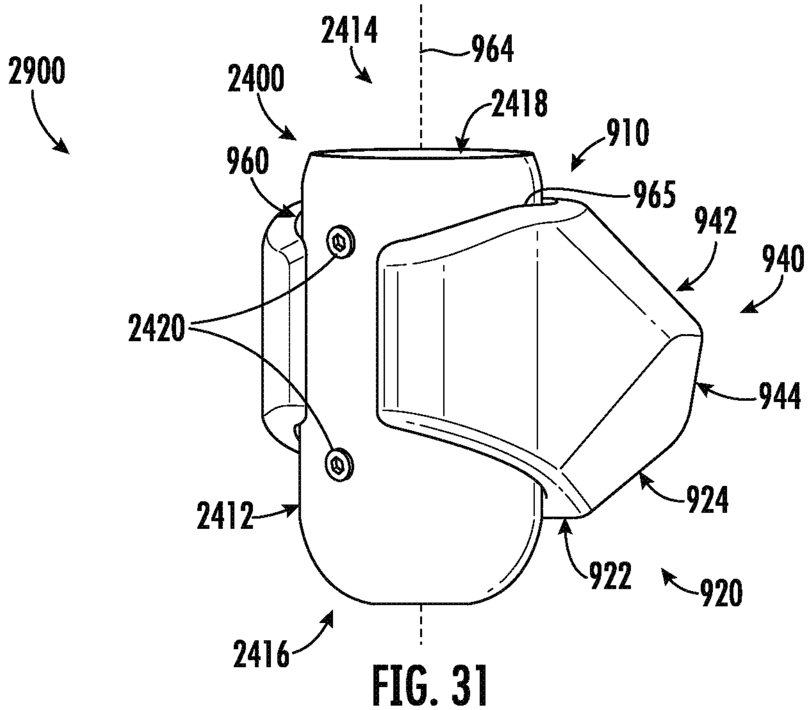
FIG. 31 is a perspective view of a grip assembly including a grip and attachment, according to an exemplary embodiment.

FIG. 31 shows a grip assembly 2900, according to an exemplary embodiment. The grip assembly 2900 includes the grip 900 and the attachment 2400. The attachment 2400 is positioned in the channel 960 of the grip 900. In some embodiments, the attachment 2400 is inserted into the channel 960 along the instrument axis 964. In some embodiments, the attachment 2400 is inserted into the channel 960 through the front side 930 of the grip 900. In some embodiments, the relief slot 962 may move (e.g., expand) to allow the channel 960 to receive the attachment 2400. The outer portion 2412 of the attachment 2400 engages the channel surface 965 of the channel 960. In some embodiments, the hand-held instrument may be inserted into the attachment 2400 and the screws 2420 may be tightened (e.g., to secure the hand-held instrument within the inner portion 2418 of the attachment 2400) before the channel 960 receives the attachment 2400. In some embodiments, the attachment 2400 may be inserted into the channel 960 of the grip 900, and then, the hand-held instrument is inserted into the inner portion 2418 of the attachment 2400 and the screws 2420 are adjusted (e.g., tightened or loosened) to secure the hand-held attachment with the grip 900.

According to the exemplary embodiment shown in FIG. 31, the user may hold the grip assembly 2900 in their hand. The grip assembly 2900 is configured to be held by the user to engage (e.g., support) a user's palm as the user grasps the grip 900 and the attachment 2400. In some embodiments, at least a portion of the palm of the user's hand engages with the back side 940. By way of example, the first portion 942 may be positioned towards an apex of the user's palm (e.g., towards the knuckles), and the second portion 944 may be positioned towards a middle or a base of the user's palm (e.g., towards the wrist). In some embodiments, at least a portion of one or more digits of the user's hand engage with the lateral sides 950. By way of example, a portion (e.g., the middle portion or some other portion) of a user's thumb may engage one of the lateral sides 950 as a portion (e.g., the middle portion or some other portion) of one or more fingers of the user's hand engage the opposing one of the lateral sides 950. In some embodiments, at least a portion of the one or more digits of the user's hand engage one or more of the front side 930 or the bottom side 920 of the grip 900 or the outer portion 2412 to grasp the grip assembly 2900. By way of example, at least a portion (e.g., a top portion, an end portion, a pad, a tip, or some other portion) of the user's thumb may engage the front side 930 or the first portion 922 of the bottom side 920 of the grip 900. Further, a portion (e.g., a top portion, an end portion, a pad, a tip, or some other portion) of the user's one or more fingers may engages the outer portion 2412 of the attachment 2400.

Figure 24:
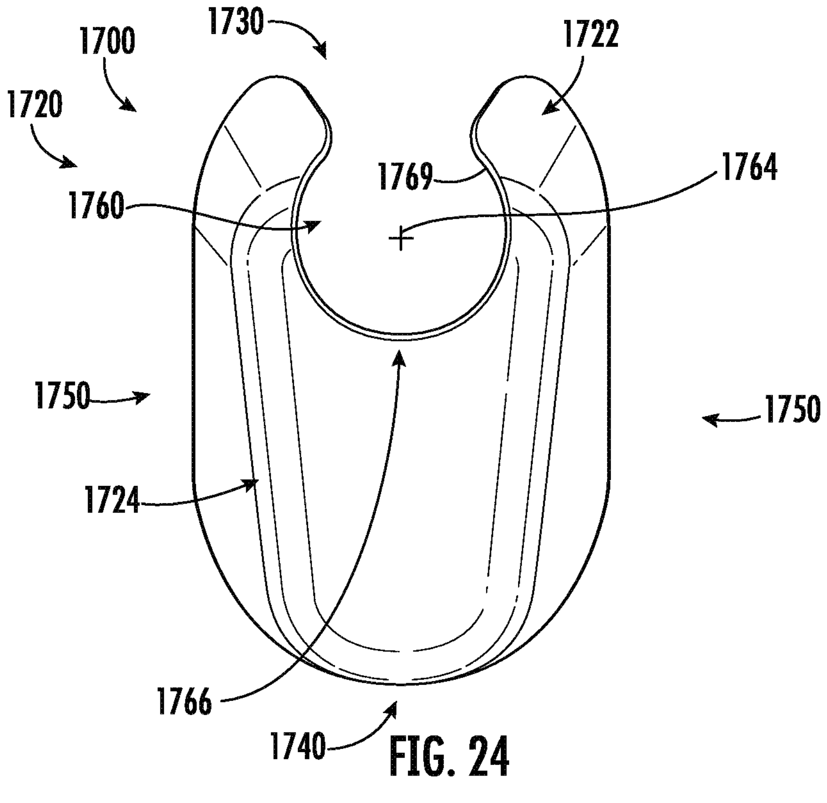
FIG. 24 is a bottom view of the grip of FIG. 17.
Figure 32:
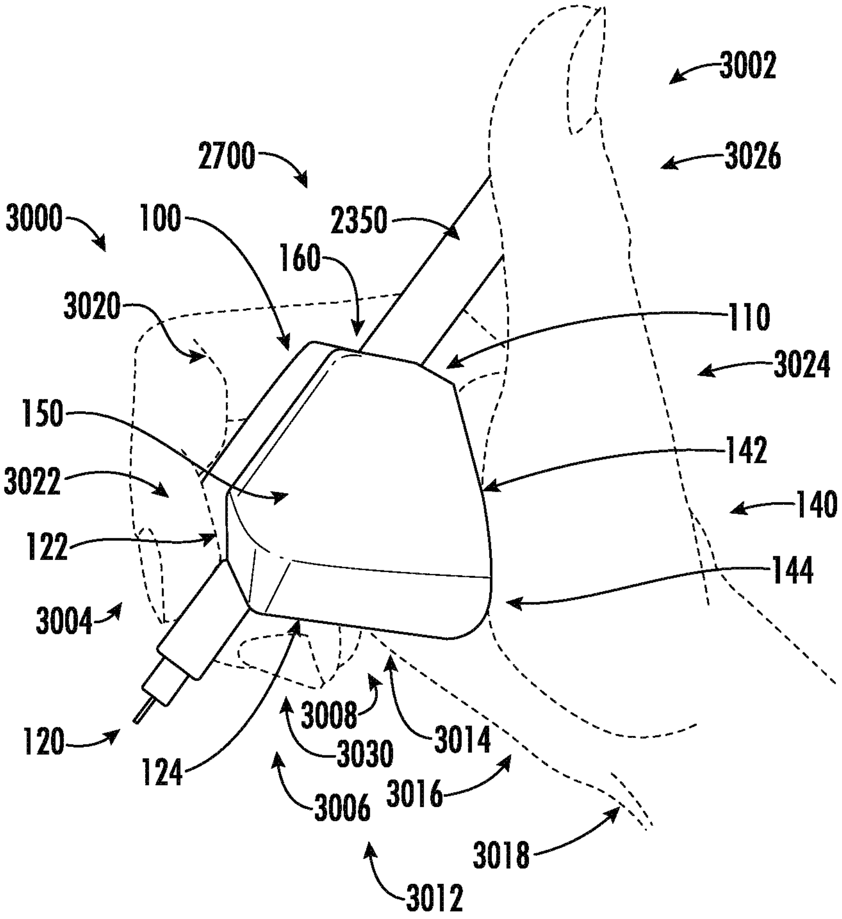
FIG. 32 is a side view of a grip assembly including a grip and an instrument grasped by a user to show a manner of holding a grip assembly, according to an exemplary embodiment.
Figure 33:
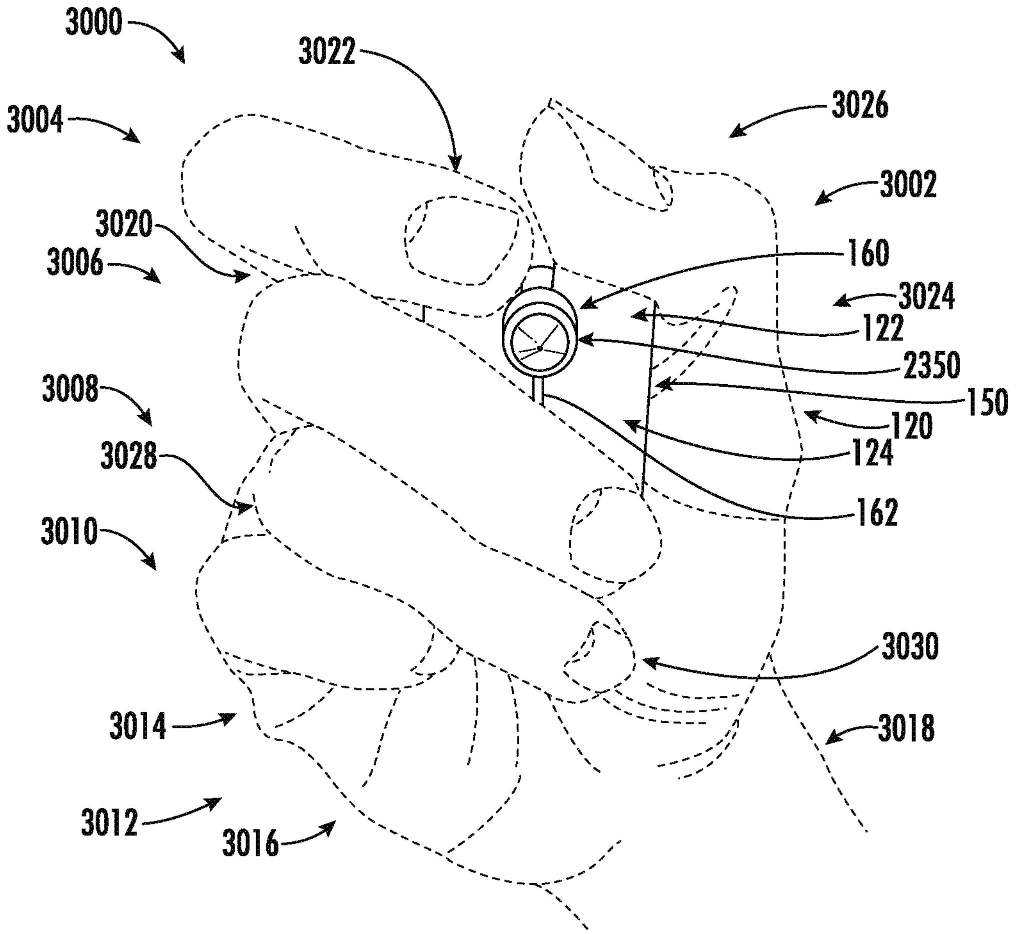
FIG. 33 is a bottom view of a grip assembly including a grip and an instrument grasped by a user to show a manner of holding a grip assembly, according to an exemplary embodiment.
Figure 34:
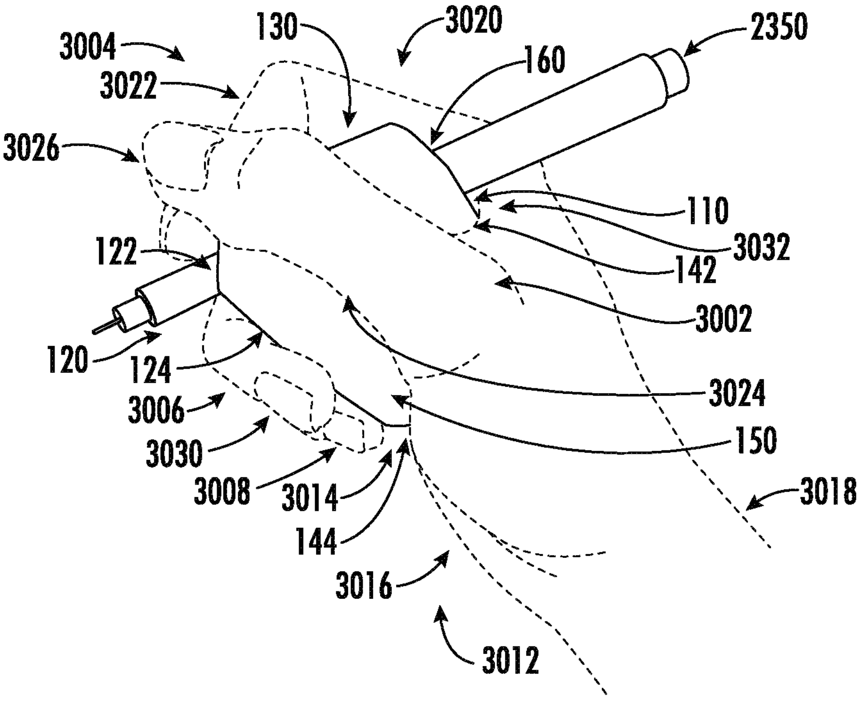
FIG. 34 is a side view of a grip assembly including a grip and an instrument grasped by a user to show a manner of holding a grip assembly, according to an exemplary embodiment.

FIGS. 32-34 show a user holding a grip, according to an exemplary embodiment. More specifically, the user is holding a grip assembly that includes a hand-held instrument inserted into the grip. The grip assembly shown in FIGS. 32-24 is similar to the grip assembly 2700 which includes the grip 100 and the hand-held instrument 2350, with like terms and reference numerals used to describe like features. It should be noted that the manner of holding the grip 100 may be similar, in some respects, to how the user can hold the grip 900 or the grip 1700. A user's hand generally includes one or more digits extending from a palm or central portion of the user's hand. The user can hold the grip by engaging the back side of the grip 100 with the user's palm and wrapping, curling, or engaging the one or more digits around or with the lateral sides of the grip 100.

For example, a user's hand 3000 can include a first digit 3002 (e.g., a thumb), a second digit 3004 (e.g., an index finger), a third digit 3006 (e.g., a middle finger), a fourth digit 3008 (e.g., a ring finger), and a fifth digit 3010 (e.g., a pink finger) extending from a palm 3012 of the user's hand 3000. The palm 3012 of the user's hand includes an upper or first section 3014 (e.g., a portion of the palm 3012 above the first digit 3002 toward the second digit 3004, the third digit 3006, the fourth digit 3008, and the fifth digit 3010) and a lower or second section 3016 (e.g., a portion of the palm 3012 laterally spaced from the first digit 3002 toward a wrist portion 3018 of the user's hand 3000. It should be noted that FIGS. 32-34 show the user holding the grip assembly 2700 in the user's right hand and that the user may similarly hold the grip assembly 2700 in their left hand.

FIG. 32 shows an example manner of holding the grip assembly 2700 from a side view of the grip 100, according to an exemplary embodiment. The user's hand 3000 is in a partially open position defined by the first digit 3002 being oriented or pointed upward (e.g. with respect to FIG. 32) and the second digit 3004, the third digit 3006, the fourth digit 3008, and the fifth digit 3010 being curled or oriented towards the palm 3012. The grip 100 can be positioned proximate to or towards the first digit 3002 and the second digit 3004. In some embodiments, the back side 140 of the grip 100 can engage the palm 3012. More specifically, the first portion 142 of the back side 140 may engage a portion of the upper section 3014 and a portion of the lower section 3016 of the palm 3012. Further, the second portion 144 of the back side 140 of the grip 100 may engage a portion of the lower section 3016 of the palm 3012.

In some embodiments, the second digit 3004 engages the top side 110 and bottom side 120 of the grip 100. More specifically, a base portion 3020 of the second digit 3004 can engage the top side 110, and an apex portion 3022 of the second digit 3004 can engage the first portion 122 of the bottom side 120 to secure, support, or position the grip 100 against the palm 3012 of the user's hand 3000. In some embodiments, the third digit 3006 can be positioned toward the lateral side 150 and engage the bottom side 120 of the grip 100. More specifically, the third digit 3006 may be positioned along the lateral side 150 (e.g., the lateral side 150 spaced farthest from the first digit 3002) of the grip 100. Further, the third digit 3006 can engage the second portion 124 of the bottom side 120 to secure the grip 100 within the user's hand 3000. In some embodiments, the second digit 3004 and the third digit 3006 may engage the hand-held instrument 2350 to support the grip assembly 2700 within the user's hand 3000. In the illustrated embodiment, the apex portion 3020 of the second digit 3004 engages a portion of the hand-held instrument 2350 extending through the channel 160 towards the bottom side 120 of the grip 100.

FIG. 33 shows an example manner of holding the grip assembly 2700 from a bottom view of the grip 100, according to an exemplary embodiment. The user's hand 3000 is in a closed or grip position defined by the first digit 3002, the second digit 3004, and the third digit 3006 being wrapped, curled, or arranged around the grip 100 and the hand-held instrument 2350. In some embodiments, the grip position is further defined by the fourth digit 3008 and the fifth 3010 being curled or in a bended position towards the bottom side 120 of the grip 100. In some embodiments, the first digit 3002 engages the lateral side 150, the front side 130, and the bottom side 120 of the grip 100. More specifically, a base portion 3024 of the first digit 3002 engages the lateral side 150, and an apex portion 3026 of the first digit 3002 engages the first portion 122 of the bottom side 120 of the grip 100. In some embodiments, the apex portion 3026 of the first digit 3002 engages a portion of the front side 110 of the grip 100.

In some embodiments, the second digit 3004 can engage the bottom side 120 or the front side 110 of the grip 100. More specifically, the apex portion 3022 of the second digit 3004 can engage the first portion 122 of the bottom side 120. In some embodiments, a portion of the second digit 3004 can engage the front side 110 and/or the hand-held instrument 2350 within the channel 160. In some embodiments, the third digit 3006 can engage the lateral side 150 and the bottom side 120. More specifically, in some embodiments, a base portion 3028 of the third digit 3006 can engage the lateral side 150, and an apex portion 3030 of the third digit 3006 can engage the first portion 122 of the bottom side 120. In some embodiments, the fourth digit 3008 curls under or engages a bottom side of the third digit 3006 as the user's hand 3000 grasps the grip 100. In such embodiments, the fourth digit 3008 can engage the bottom side 120 and/or the back side 140 of the grip 100. In some embodiments, the fifth digit 3010 curls under or engages a bottom side of the fourth digit 3008.

FIG. 34 shows an example manner of holding the grip assembly 2700 from a side view of the grip 100, according to an exemplary embodiment. The user's hand 3000 is in a grip position, similar to the grip position shown in FIG. 33. The user's hand 3000 is grasping the grip 100 such that the palm 3012 defines a nook or crest portion 3032 of the user's hand 3000 that is continuous with the base portion 3024 of the first digit 3002 and the base portion 3020 of the second digit 3004. The crest portion 3032 is defined by the palm 3012 being shaped or curved to allow the grip 100 to be received by the user's hand 3000. More specifically, the first portion 142 of the back side 140 of the grip 100 is received by the upper section 3014 of the palm 3012, and the second portion 144 of the back side 140 of the grip 100 is received by the lower section 3016 of the palm 3012.

In some embodiments, the first digit 3002 can wrap or curl around and/or engage the lateral side 150, the front side 130, and the bottom side 120. More specifically, the base portion 3024 of the first digit 3002 can wrap around and/or engage the lateral side 150, and the apex portion 3026 of the first digit 3002 can engage the first portion 122 of the bottom side 120 and/or a portion of the front side 130 of the grip 100. In some embodiments, the third digit 3006 and the fourth digit 3008 can wrap or curl around the bottom side 120 of the grip 100 and engage the lateral side 150 opposite the lateral side 150 proximate to the third digit 3006 and the fourth digit 3008. It should be noted that the engagement of the user's hand 3000 with the grip assembly 2700 is described with respect to the hand 3000 shown in FIGS. 31-33 and that engagement may vary from person to person based on the size, anatomy, and configuration of a person's hand and/or the grip, the hand-held instrument, or the attachment of a grip assembly.

A grip is configured to support the user's hand to reduce fatigue from a hand-held instrument. In some embodiments, the hand-held instrument 2350 may be an instrument that can be heavy and may vibrate in use (e.g., tattoo machine, soldering machine, and other powered hand-held equipment). For example, the user may hold a tattoo iron for an extended time period (e.g., several hours). In such an example, the user's wrist may become fatigued as a result of one or more of the weight of the tattoo iron, the vibration of the tattoo iron, the extended time period, or other fatiguing exposures from the hand-held instrument. The grip supports the user's hand to reduce fatigue from the hand-held instrument. More specifically, the grip is configured to occupy a space (e.g., gap) created by a user's curled fingers and engage the user's palm to support the user's hand as the user grasps the grip. The grip supports the user's palm and allows the user's wrist to be oriented in a more comfortable position to reduce fatigue from the hand-held instrument.

It should be noted that the grips and/or grip assemblies, as described herein, can be held or positioned within the user's hand in other ways than previously mentioned. By way of example, a user's preferred or trained way of holding a pencil may differ with that of another user. Additionally, it should be noted that any one of the grips and any one of the attachments can be combined to form a grip assembly other than what is shown in the figures and described herein.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. For example, the grip 100 of the exemplary embodiment described in at least paragraph (s) [0043]-[0053] may be incorporated in the grip 900 or the grip 1700 of the exemplary embodiments described in at least paragraph(s) [0054]-[0078]. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A grip for a hand-held instrument, comprising:

a top side;

a bottom side including a first portion oriented at an acute angle relative to the top side, and a second portion oriented at an obtuse angle relative to the first portion, wherein the top side is smaller than the bottom side;

a front side continuous with the first portion of the bottom side;

a first lateral side and a second lateral side, the first lateral side and the second lateral side continuous with the second portion of the bottom side;

a back side including a first portion continuous with a second portion, the first portion extending in a direction away from the front side and oriented at a first obtuse angle relative to the top side, the second portion oriented at a second obtuse angle relative to the bottom side; and a channel extending through the top side and the bottom side, the channel defining a relief slot and an instrument axis, the instrument axis extending through the first portion of the bottom side and extending through the top side, wherein the instrument axis is positioned on a plane extending through a center of the grip.

2. The grip of claim 1, wherein the front side is substantially parallel to the instrument axis.

3. The grip of claim 1, wherein the first lateral side and the second lateral side are substantially a same distance from the plane extending through the center of the grip.

4. The grip of claim 1, wherein the first portion of the bottom side is angled rearward relative to the front side and toward the instrument axis.

5. The grip of claim 1, wherein the grip is sized to engage with a palm of a user's hand, and wherein the front side and the bottom side are configured to engage one or more fingers of the user's hand and the back side is configured to support a portion of the palm of the user's hand.

6. The grip of claim 1, wherein the grip is sized to engage with a palm of a user's hand, and wherein one of the first lateral side and the second lateral side is configured to support a portion of a user's thumb, and wherein the back side is configured to support a portion of the palm of the user's hand.

7. The grip of claim 1, wherein the channel is accessible from the front side and the first portion of the bottom side, and wherein the relief slot extends from the top side to the bottom side.

8. The grip of claim 1, wherein the channel is accessible from the front side and the first portion of the bottom side, and the channel is configured to receive at least a portion of the hand-held instrument, and wherein the relief slot expands for the portion of the hand-held instrument.

9. The grip of claim 1, wherein the channel is configured to receive at least a portion of the hand-held instrument, and wherein the hand-held instrument is one or more of a soldering tool, a tattoo machine, or a writing utensil.

10. The grip of claim 1, wherein the relief slot is substantially parallel to the instrument axis and positioned at a base of the channel.

11. A grip for a hand-held instrument comprising:
- a top side;
- a bottom side including a first portion and a second portion, the first portion oriented at a first obtuse angle relative to the second portion;
- a channel extending from the top side to the bottom side, the channel configured to receive at least a portion of the hand-held instrument along an instrument axis, the instrument axis extending through the first portion of the bottom side;
- a relief slot positioned within the channel;
- a front side configured to engage one or more fingers of a user's hand, wherein the channel is open to the front side;
- a back side configured to support a portion of a palm of the user's hand, the back side including a first portion oriented at a second obtuse angle relative to the top side, wherein the first portion of the back side is substantially continuous with the top side; and
- a lateral side configured to support a portion of a user's thumb, the lateral side continuous with the second portion of the bottom side, wherein the instrument axis is positioned on a plane extending through a center of the grip.

12. The grip of claim 11, wherein the relief slot is positioned at a base of the channel, the relief slot extending along the channel from the top side to the bottom side.

13. The grip of claim 11, wherein the channel defines the instrument axis, and wherein the front side is substantially parallel to the instrument axis.

14. The grip of claim 11, wherein the back side comprises a planar surface.

15. The grip of claim 11, wherein the channel is accessible from the front side and the first portion of the bottom side.

16. The grip of claim 11, wherein the first portion of the back side extends in a direction away from the front side.

17. A grip assembly comprising:

a grip including;
- a top side;
- a bottom side including a first portion oriented at an acute angle relative to the top side, and a second portion oriented at an obtuse angle relative to the first portion;
- a front side continuous with the first portion of the bottom side;
- a back side including a first portion continuous with a second portion, the first portion continuous with the top side, extending in a direction away from the front side, and oriented at a first obtuse angle relative to the top side, and wherein the second portion is oriented at a second obtuse angle relative to the bottom side;
- a first lateral side and a second lateral side, the first lateral side and the second lateral side continuous with the second portion of the bottom side; and
- a channel extending from the top side to the bottom side, the channel defining a relief slot and an instrument axis, the instrument axis extending through the first portion of the bottom side; and an attachment coupled to the grip, wherein the attachment is structured to be received by the channel and positioned along the instrument axis, wherein the instrument axis is positioned on a plane extending through a center of the grip and the attachment.

18. The grip assembly of claim 17, wherein the attachment defines a volume greater than a volume defined by the channel such that the relief slot expands for the channel to receive the attachment.

19. The grip assembly of claim 17, wherein the attachment is structured to receive a hand-held instrument, and wherein the hand-held instrument is one or more of a soldering tool, a tattoo machine, or a writing utensil.

20. The grip assembly of claim 17, wherein the attachment is structured to receive a hand-held instrument, and wherein the attachment includes a screw such that the screw limits movement of the hand-held instrument.

* * * * *